United States Patent
Luo et al.

(10) Patent No.: US 7,937,684 B2
(45) Date of Patent: *May 3, 2011

(54) SYSTEM AND METHOD FOR ENABLING ASSISTED VISUAL DEVELOPMENT OF INCOMING MESSAGE HANDLING OPERATIONS FOR APPLICATIONS ON A COMMUNICATION DEVICE

(75) Inventors: Zhonghai Luo, Toronto (CA); Bryan Goring, Milton (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 1357 days.

This patent is subject to a terminal disclaimer.

(21) Appl. No.: 11/452,985

(22) Filed: Jun. 15, 2006

(65) Prior Publication Data

US 2007/0294413 A1    Dec. 20, 2007

(51) Int. Cl.
*G06F 9/45*    (2006.01)
(52) U.S. Cl. ........................................................ 717/100
(58) Field of Classification Search .................... 717/100
See application file for complete search history.

(56) References Cited

U.S. PATENT DOCUMENTS

| | | | |
|---|---|---|---|
| 6,233,726 B1 | 5/2001 | Bowman et al. | |
| 6,738,964 B1 * | 5/2004 | Zink et al. | 717/105 |
| 6,748,583 B2 * | 6/2004 | Aizenbud-Reshef et al. | 717/127 |
| 7,747,958 B2 * | 6/2010 | Luo et al. | 715/762 |
| 2002/0047863 A1 * | 4/2002 | Hyman | 345/744 |
| 2002/0120919 A1 * | 8/2002 | Aizenbud-Reshef et al. | 717/127 |
| 2005/0057560 A1 | 3/2005 | Bibr et al. | |
| 2006/0168577 A1 * | 7/2006 | Melo et al. | 717/168 |

FOREIGN PATENT DOCUMENTS

WO    02/33512 A2    4/2002

OTHER PUBLICATIONS

Office Action issued by the Canadian Intellectual Property Office dated Feb. 24, 2010 for corresponding Canadian Patent Application No. 2,550,254.

* cited by examiner

*Primary Examiner* — John Chavis
(74) *Attorney, Agent, or Firm* — Gowling Lafleur Henderson LLP

(57) ABSTRACT

A message wizard enables assisted visual development of operations to process an incoming message for an application on a communication device. The wizard provides a series of pages from which a developer can select a desired action to perform on a target upon receipt of the incoming message and select a specific target comprising at least one data component from a set of candidate data components. The wizard then automatically generates code to implement the selected action on the target. A message page to visualize the message, target and the relationship between then and, as applicable, any script generated to implement the action may also be provided. The wizard may provide a data component type page to select a type of data component and then provide the series of pages in response to the type of data component selected.

20 Claims, 30 Drawing Sheets

SYSTEM AND METHOD FOR ENABLING ASSISTED VISUAL DEVELOPMENT OF INCOMING MESSAGE HANDLING OPERATIONS FOR APPLICATIONS ON A COMMUNICATION DEVICE

TECHNICAL FIELD

The following description relates generally to wireless communications and, in particular, to a method and system for enabling assisted visual development of incoming message handling operations that are executed in applications running on wireless or other communication devices.

BACKGROUND

The number and variety of wireless terminal devices, such as mobile telephones, wireless-enabled laptop computers and PDAs (Personal Digital Assistants) with wireless communication capabilities, self-service kiosks and two-way pagers are rapidly increasing. Software applications that run on these devices increase their utility. For example, a mobile phone may include an application that retrieves the weather for a range of cities, or a PDA may include an application that allows a user to shop for groceries. These software applications take advantage of wireless connectivity to a data network (such as the Internet) in order to provide timely and useful services to users.

A typical wireless application may include more than one hundred different messages exchanged between the wireless terminal device and a server (e.g. a network gateway server, back-end server or web services server) facilitating the application.

Traditionally, software developers have had to manually create message components, data components, and corresponding primary keys in their application, and write script codes to process related messages (e.g. create, update, delete data components). This prior-art approach is time-consuming and furthermore requires significant time and effort to debug the code for minor misspellings, syntax errors, problematic variable definitions or other logical inconsistencies. As programmers end up devoting time and energy to coding mechanics and syntax, they inevitably do not concentrate fully on the design and implement application functionalities.

Accordingly, it would be highly desirable to provide a method and system for assisted visual development of incoming messages to facilitate and expedite application development.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
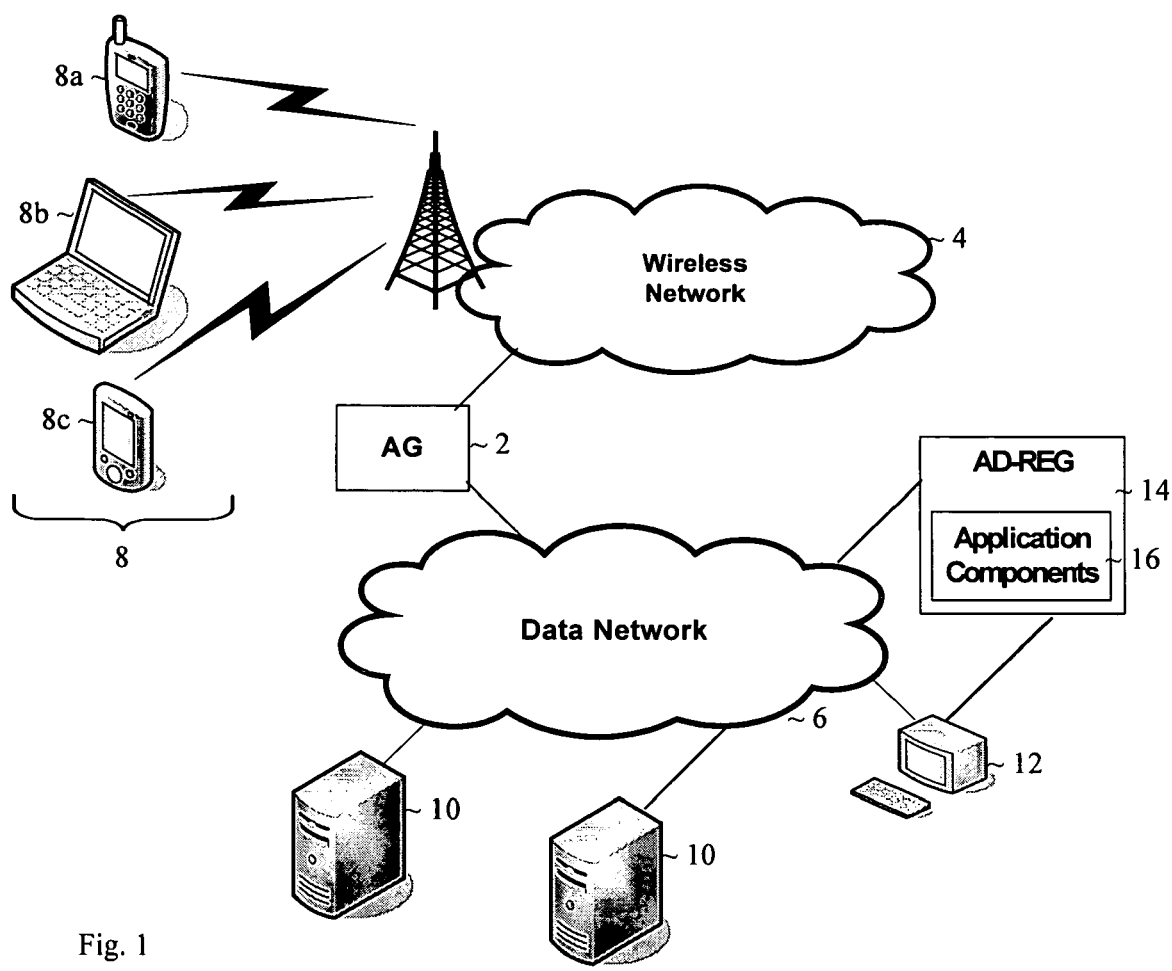
FIG. 1 is a block diagram schematically illustrating a network in which the method, system and other aspects described herein may be deployed.

There is provided methods and systems for enabling assisted visual development of incoming message processing for an application. Based on selected content and operations on a message, a message wizard automatically generates message components, data components, corresponding primary keys as applicable, and relevant script codes for developers. The automatically generated code is efficient code that requires no debugging by the application developer, so that the developer can focus time and energy on design and implement application logic.

Thus, an aspect provides a method of enabling assisted visual development of incoming message handling operations for an application on a communication device. The method includes the step of providing an action page from which a user can select a desired action to perform on a target upon receipt of an incoming message. The method also includes the step of providing at least one data selection page from which the user can select a specific target comprising at least one data component from a set of candidate data components. The method further includes the step of automatically generating code to implement the selected action on the target.

Preferably, the method also includes a step of providing a data component type page from which the user can select a type of data component. As such, the steps of providing an action page and providing at least one data selection page can be responsive to the type of data component selected. The step of providing a data component type page may present a plurality of data component types from which the user may select the type of data component. The plurality of types can include: an independent data component type, a nested data component type and a global variable data component type.

The method may include the step of providing a message page to visualize the message and its relationship to the target. The message page may provide an interface to graphically illustrate the message, the target, a mapping relationship between the message and the target. Also, the message page may provide an interface to the auto-generated code, such as a script generated to implement the action.

Another aspect provides a system for visually assisting an application developer with development of operations to process an incoming message for an application. The system includes a computing device for exchanging data with a data network whereby a wireless application can be uploaded to an application gateway that mediates between the data network and a wireless network serving a plurality of wireless devices to thus enable the wireless devices to download the wireless application. The system also includes an application development environment (ADE) running on the computing device, the ADE including a message wizard for visually assisting the application developer with the development of operations to process an incoming message by the application, the ADE including a plurality of graphically presented options for viewing and selecting action target types, action options, and specific targets for the selected actions, whereby the ADE visually guides the application developer through the creation of the message and then automatically generates code for executing operations defined by the message.

In one feature, the ADE comprises a message wizard for graphically presenting the options in a sequence of pages including an action page to enable the developer to select a desired action (possibly from a plurality of candidate actions) to perform on the target upon receipt of the incoming message; and at least one data selection page to enable the developer to select a specific target comprising at least one data component from a set of candidate data components; and a code auto-generator for automatically generating the code that is capable of executing the action on the target upon receipt of the message. Preferably, the sequence of pages further includes a data component type page from which the user can select a type of data component. As such the presentation of the action page and the at least one data selection page may be responsive to the type of data component selected.

In yet a further aspect, there is provided a computer program product having computer readable code embodied therein for execution by a processor of a computing system. The computer readable code is executable to implement the method aspect.

Referring to FIG. 1, a network facilitating the use of software-driven wireless terminal devices generally includes an Application Gateway (AG) 2 coupled between a wireless network 4 and a data network 6 such as, for example, the Internet. In other words, the AG mediates data traffic flow between the wireless network 4 and the data network 6. As further illustrated in FIG. 1, a plurality of wireless terminal devices 8 are coupled to the wireless network 4 and are thus hosted by the AG 2. Therefore, the AG 2 generally operates to mediate message flows between the terminal devices 8 and a plurality of web services 10 (also known as data services) which are accessible through the data network 6 in the manner described in Applicant's co-pending United States Patent Publications Nos. 2004/0215700 and 2004/0220998, both of which are incorporated herein by reference.

In general, the terminal devices 8 can be any of a wide variety of software-controlled wireless devices including but not limited to wireless-enabled mobile/cellular telephones 8a, laptop computers 8b, and PDAs 8c with wireless communication capabilities, self-service kiosks and two-way pagers. As is well known in the art, such devices generally include a microprocessor that operates under software control to provide the functionality of the terminal device 8.

As described in Applicant's co-pending United States Patent Publications Nos. 2004/0215700 and 2004/0220998, operation of the AG 2 enables a wireless application executing in a terminal device 8 to communicate with web services 10 offered through the data network 6. This operation may, for example, include the accessing of HTML content, and the downloading of files from back-end data sources connected to the data network 6. In order to reduce device resource requirements, each wireless application provides User Interface (UI) functionality (for both display and user input) appropriate to the capabilities of the particular terminal device 8. At least a portion of the application logic is executed on the AG 2, so that signalling between the AG 2 and the terminal device 8 is limited to downloading application data for local storage and display on the terminal device 8, and uploading user inputs. The application logic executing on the AG 2 communicates with a web service 10 or a back-end data source on the data network 6 in response to the user input received from the terminal device 8 to provide the functionality of a wireless application. This arrangement enables a user of the terminal device 8 to access and use the web service 10, but with reduced signalling traffic to and from the terminal device 8 to thereby limit wireless network bandwidth and device resource requirements.

Periodically, as is known in the art, wireless applications (or updates) are released, for example to provide new and/or improved functionality or to eliminate a bug in the source code. An application developer (AD) 12 connected to the data network 6 can produce an original or an updated version of a wireless application for remote dissemination to the wireless terminal devices via the data network 6, AG 2 and the wireless network 4. Remote provisioning of wireless applications can be accomplished by uploading application components 16 (typically in a bundle where components may include definitions, scripts, installation instructions, etc.) for an application original installation or update, as applicable, to a web-accessible server or "application development registry" (AD-REG) 14. The AD 12 will concurrently publish an indication that the new or updated version of the application is now available so that the wireless devices 8 are made aware. The terminal devices 8 then download the application components 16 from the AD-REG 14.

Traditionally, in order to update a wireless application or to create a new release of a wireless application, a software developer or programmer has to expend significant time and energy in coding, testing and debugging source code for the application. As is well known in the art, application developers typically use an application development environment (ADE) to code, test, and debug application software. Therefore, in order to facilitate and expedite application development, there is provided a method and system for visually assisting an application developer with development of incoming message processing, including message components, data components, corresponding primary keys and script code for message handling.

Preferred embodiments provide an ADE that includes a "message wizard", which will be described in detail in the following paragraphs. The message wizard provides application developers with a powerful visual tool to facilitate the development process. This message wizard enables the application developer to focus on application logic without worrying about the underlying programming codes. As is known in the art, the term "wizard" means an interactive computer program acting as an interface to lead a user, or in this case an application developer, through a series of steps, typically using a sequence of dialog boxes that present options and prompt the user to make choices from those options.

Using this message wizard, application developers can easily define message operations and relations to specific data components, after which the wizard auto-generates the code that accomplishes this task.

Incoming messages generally relate to data operations (e.g. create, update or remove) for data stored on the receiving device 8. When software developers define an incoming message, they, in most cases, want to perform an operation on a data component. So the message wizard is designed from the point of view of the target data component. The message wizard thus enables an application developer to chose a type of data, define an action or operation on that type of data, to specify data attributes such as which specific data component and parts thereof, as applicable, are to be affected by the operation. The message wizard therefore guides application developers through the process of defining the message (from the perspective of data) and then automatically generates the code (the message component, data component and associated script, as applicable) that is needed to implement or execute the message operation so that when the particular message is received, the applicable code will execute and the message will be processed.

Figure 2:
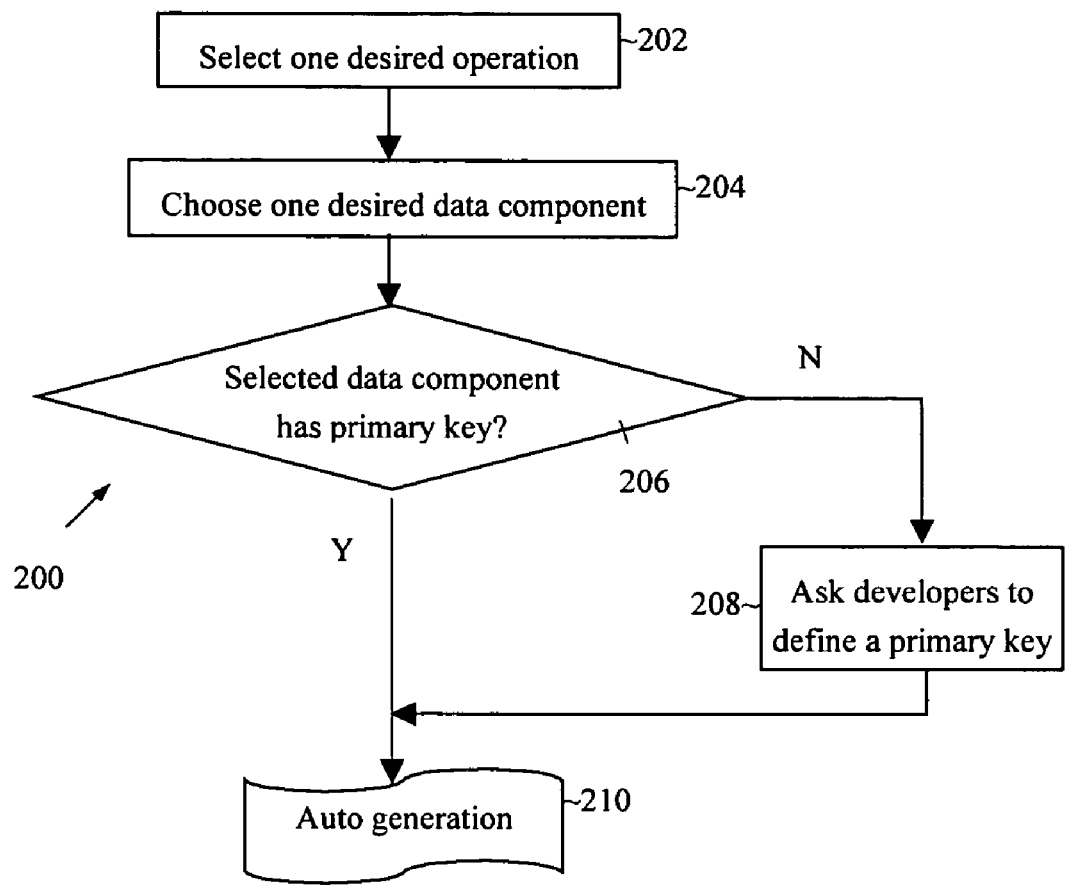
FIGS. 2-4 are flowcharts illustrating a method of visually assisting an application developer with development of a various incoming messages for an application in accordance with an embodiment.
Figure 3:
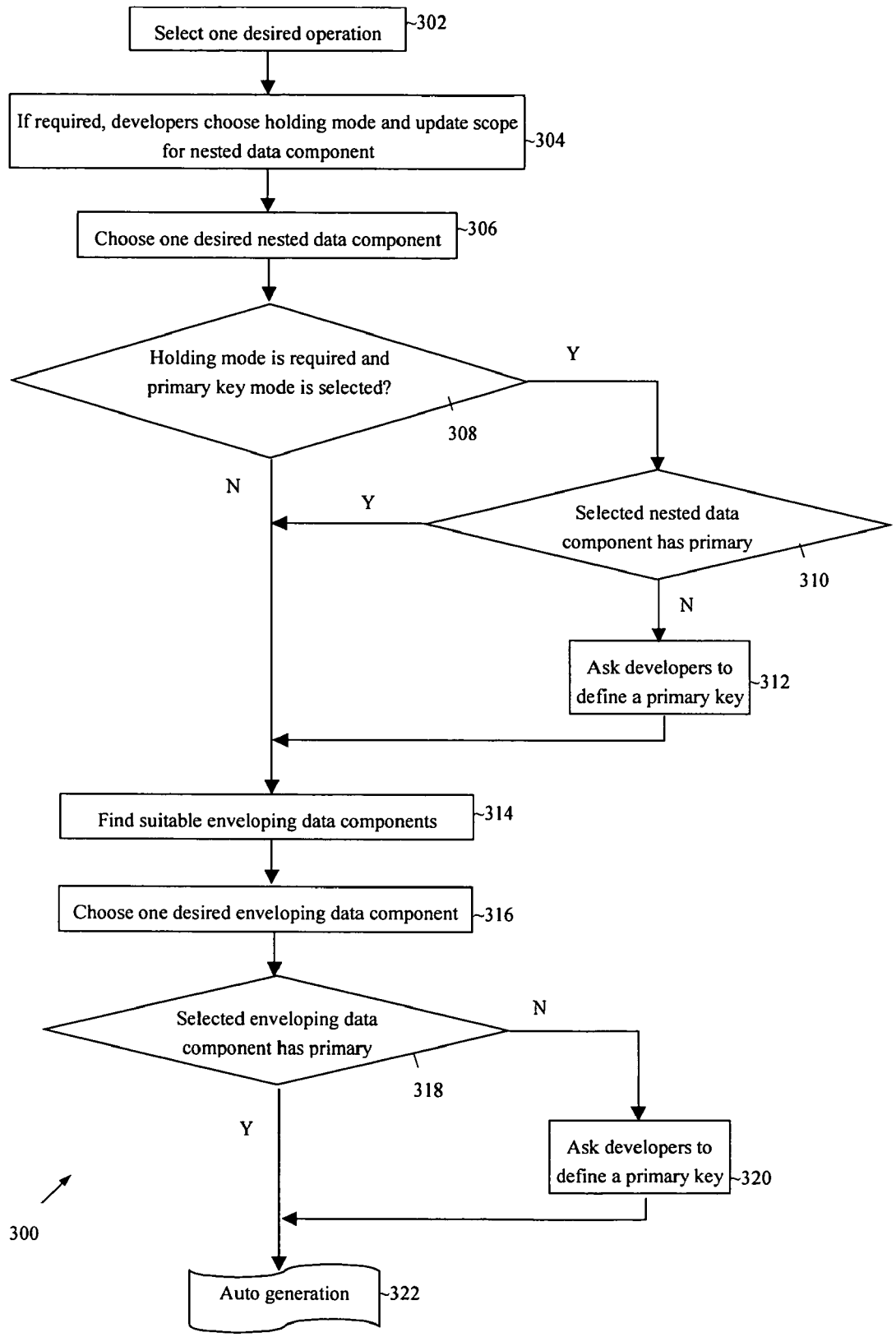
Figure 4:
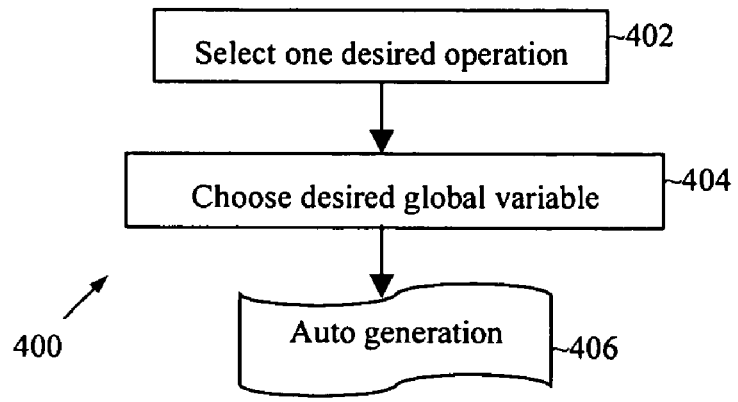

FIGS. 2-4 show flowcharts illustrating three respective methods for visually assisting an application developer with development of incoming message operations for three types of data components in accordance with a preferred embodiment. Persons of ordinary skill in the art will appreciate that not shown in the flowcharts are preliminary steps which may provide an interface to a developer to launch the message wizard, indicate that a new message is to be created, give the message a name and chose among the three data types with which the new message is to operate. Operations on three types of data components are enabled by the message wizard, namely Independent data components: If an incoming message refers to only one data component, this message operation is classified as an "operation on an independent data component" in the operation target page;

Nested (i.e. dependent) data components: If an incoming message refers to two data components (one data component is the enveloping data component and is referred to by its primary key, and another is the nested data component referred to by either the primary key or carried instance), this message operation is classified as an "operation on a nested data component" in the operation target page in this wizard; and Global variable data components: If an incoming message refers to a global variable—A global variable is application level variable, which is accessible from any screen or script. This message operation is classified as an "operation on a global variable" in the operation target page.

As will be elaborated below, the message wizard graphically presents (on the GUI of the AD computing device, as a series of pages, screens, windows or dialog boxes) a sequence of options for programming or designing the message operations. With the message wizard launched, a new message creation task identified, a new message named and the data type selected, the developer may proceed to configure desired message operations for the data type. FIG. 2 illustrates operations 200 on an independent data component. At step 202, the first page (or window or dialog box or equivalent) is an operation page (or action page) that prompts the application developer to select an operation or action to be performed on receipt of the message. Candidate operations (i.e. actions) on the independent data type include:

Create new data instance;
Update existing data instance; and
Delete existing data instance.

As further shown in FIG. 2, the message wizard then presents the application developer with a further page, namely a data selection page (step 204) from which the application developer can select a desired data component from the candidate data components. Based on the selection of the data component, the message wizard determines whether the data component has a primary key (step 206). If not, the developer is prompted to specify a primary key (step 208). Candidates from the data component may be presented for selecting as the primary key on a separate page. Once a primary key is determined (e.g. automatically or via step 206), the message wizard automatically generates code (step 210) that, when executed, will implement the message operation (e.g. mapping between the message and the data component in response to the primary key). The message and relationship to the data component may be illustrated to the developer on a message page.

FIG. 3 illustrates operations 300 on a nested data component. Operations 300 are similar to operations 200 but persons of ordinary skill in the art will appreciate that operations 300 affect two related data components, namely the enveloping component and the nested component. At step 302, the first page (or window or dialog box or equivalent) is an operation page (or action page) that prompts the application developer to select an operation or action from the operation/action page. Operations/actions on the independent data type include:

Set a nested data instance;
Add a data instance to a nested array (enveloping data component); and
Remove data instance from a nested array.

As further shown in FIG. 3, the message wizard may present the application developer with one or more pages, namely a holding mode selection page and update scope selection page (if applicable) (step 304) from which the application developer can indicate how the nested component is held and whether some or all of the data fields of the component are to be updated. The message wizard (step 306) presents a data selection page with which to select a desired nested data component from candidate data components. Based on the selection of the nested data component, the message wizard determines whether a holding mode is required and the nested data component has a primary key (steps 308 and 310). If required, the developer is prompted to specify a primary key (step 312). Candidate data fields from the data component may be presented for selecting as the primary key. Once a primary key is determined (e.g. automatically or via step 312), the message wizard determines suitable candidate enveloping data components (step 314) and presents the candidates for the developer to select a desired enveloping data component (step 316). Steps 318 and 320, like steps 206 and 208, determine the primary key for the enveloping data component. Thereafter the message wizard automatically generates code (step 322) that, when executed, will implement the message operation (e.g. mapping between the message and the respective enveloping and nested data components in response to the primary keys and specified scope and executing any scripts necessary for the desired action on the data components).

FIG. 4 illustrates operations 400 for action (i.e. message operation) on a global variable. At step 402, an operation/action page is presented. In this preferred embodiment, only an update action is permissible. At step 404 the message wizard presents a data selection page with which the developer may select a desired global variable (or its specific field) for the update operation. At step 406, the message wizard automatically generates code for the operation with the desired data component.

Though not shown, after the code is auto-generated in any of operations 200, 300 or 400, the message wizard can close down, display a code window, or enable manual editing/debugging of the code or present a visual representation of the message showing a relation to the data component(s).

Figure 5:
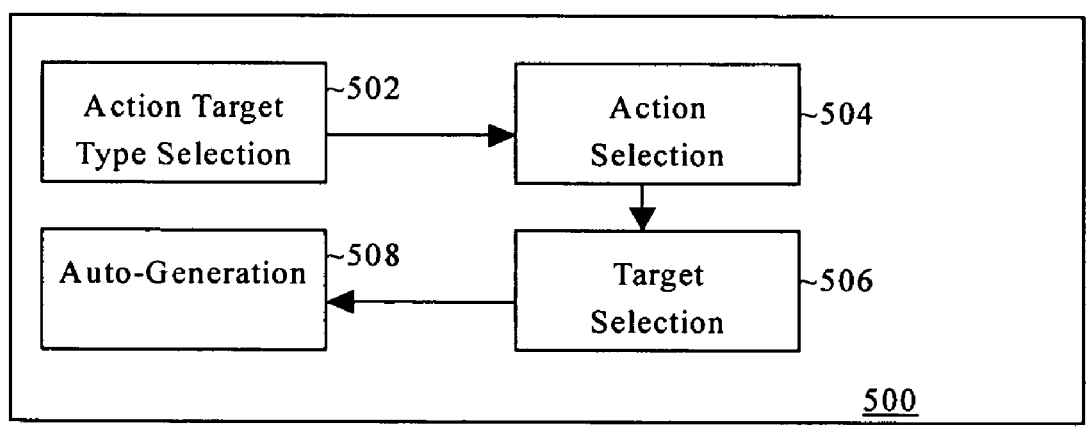
FIG. 5 schematically illustrates a framework of a message wizard in accordance with an embodiments.

FIG. 5 schematically illustrates a summary framework of the message wizard in accordance with embodiments. The message wizard 500 graphically presents message-defining options in a sequence of pages and includes (i) an action target type selection component 502, also known as an data component type selection component, which enables the application developer to define what type of data (i.e. type of the target) is to be the target of the message operation; (ii) an action selection component 504 to chose the type of operation to be applied to the data component, (iii) a data target selection component 506 that enables the application developer to select a data target from a set of available data targets; and (iv) an auto generation component 508 that generates code for mapping relationships and associated scripts (as necessary) to generate the computer codes to implement the developers choices and configurations.

For the purposes of this specification, the term "target" means the targeted object of the incoming message operation, namely a target data component.

In addition to the exemplary illustrated pages of message wizard 500, persons of ordinary skill in the art will appreciate that one or more preliminary pages may be employed such as to facilitate the developer to create a new incoming message operation (or redefine an existing incoming message operation) and to provide a name or other identifier for the new message (not shown).

Figure 6:
FIG. 6 illustrates a representative action target type page.

FIG. 6 illustrates an action target type selection page 600 for an incoming message to enable developers to select a type of action target (i.e. data component type) to which the content/operation of the incoming message will be applied. In the present embodiment, three data component types are available for selection as described earlier. Examples of action selection, target selection and code auto-generation pages for each of the independent data component type, nested data component type and global variable data component type are shown in FIGS. 7-14B, 15-26 and 27-29 respectively.

Figure 7:
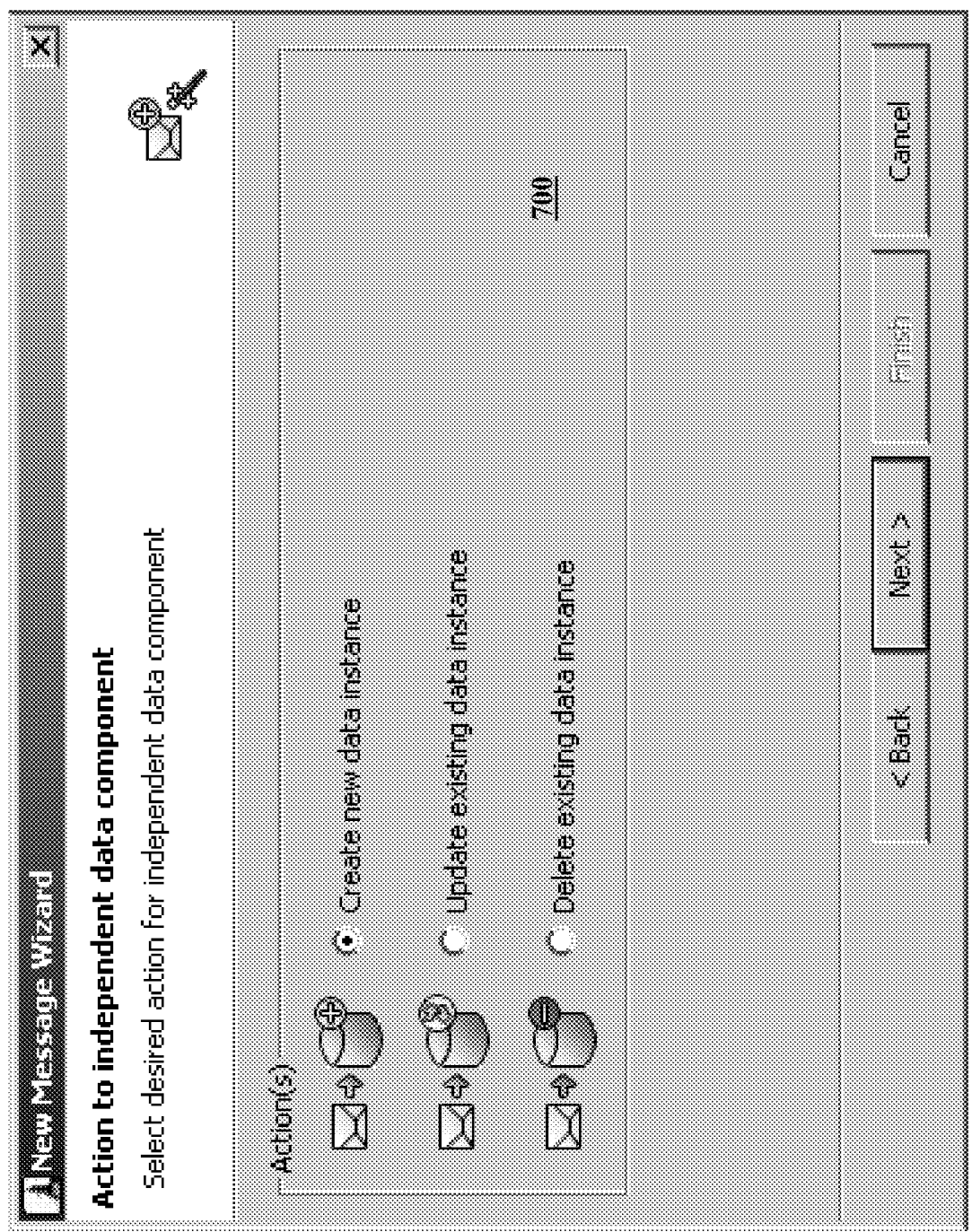
FIGS. 7-14B illustrate representative action, data component selection and message pages for programming a message-related aspect of an application for a first type of data component, namely an independent data component.
Figure 8:
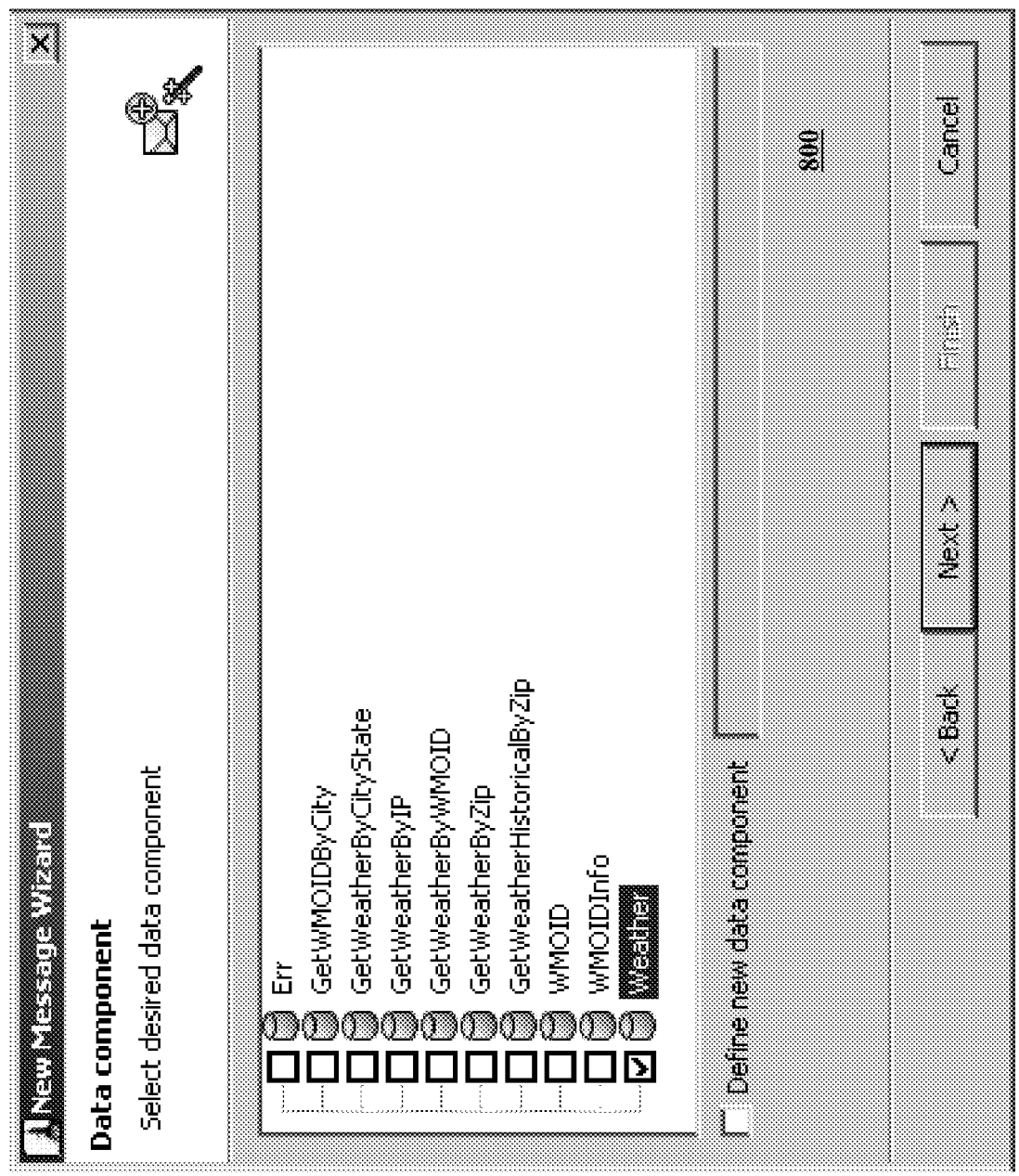

FIG. 7 illustrates an action selection page 700 for an independent data component. Available actions are "create new data instance", "update existing data instance" and "delete data instance". Selecting the "create new data instance" action configures an incoming message operation to, at runtime when the specified message is received, create an instance of the data component and populate it with the message content on the runtime device. FIG. 8 illustrates a data component selection page 800 for this data component type. A developer can select one of the available data components defined previously to associate to this message. Typically, the wizard is responsive to the type of data component selected via page 600. The wizard determines which data components are of the type selected and presents (i.e. displays) this set of components in page 800. The set may have zero one or more candidate data components. Optionally, a "define new data component" box may be presented to permit a developer define a new data component (operations not shown) should no suitable candidate is presented.

Figure 9:
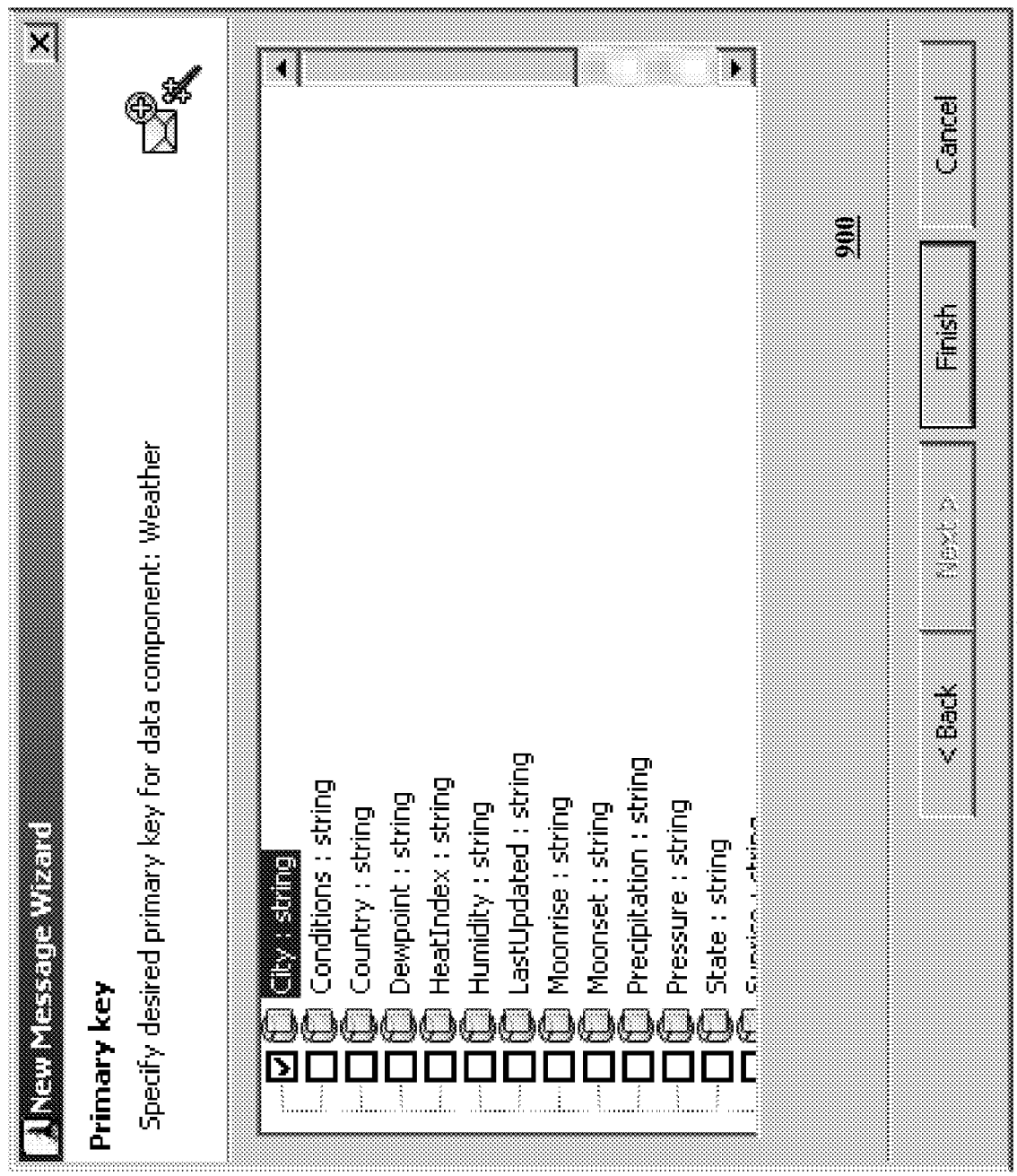

Primary key specification for the data component is illustrated in FIG. 9. If a primary key is not pre-indicated for a selected data component, a developer may indicate (i.e. check) one.

With the data component type, action and specific independent data component identified or configured, the message wizard can auto-generate the mapping code and any associated scripts, as required, to implement the message operations on the runtime device (e.g. 8 of FIG. 1). Such code may comprise definitions in a language such as XML. Scripts may comprise code in a scripting language like ECMAScript (e.g. ECMA-262 a vendor-neutral script standard maintained by Ecma International) or others.

Since the code auto-generator 508 automatically generates code that is free of syntactical errors and misspellings, the application developer saves a great deal of time and energy in developing an application or an update. Therefore, many routine tasks can be coded very quickly and efficiently. The message wizard effectively liberates the application developer from the minutiae and mechanics of coding and thus allows the developer to focus on application logic, efficient message and interface ergonomics rather than worrying about syntax, variable definitions and coding consistency.

Figure 10:
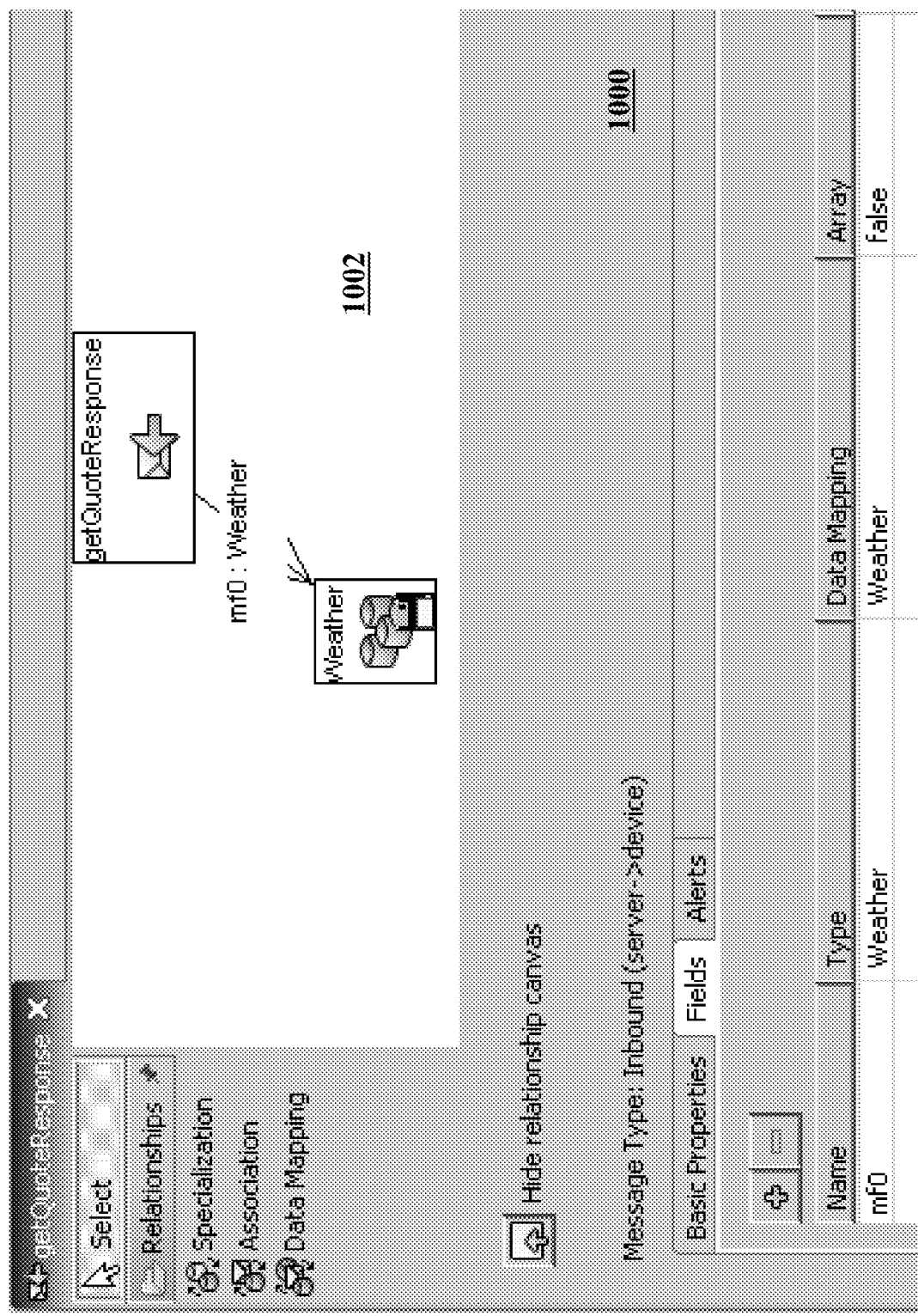

FIG. 10 illustrates a generated message page 1000 showing a mapping relationship between the new incoming message and the specified data component. Preferably the mapping relation is shown graphically 1002 as well.

Figure 11:
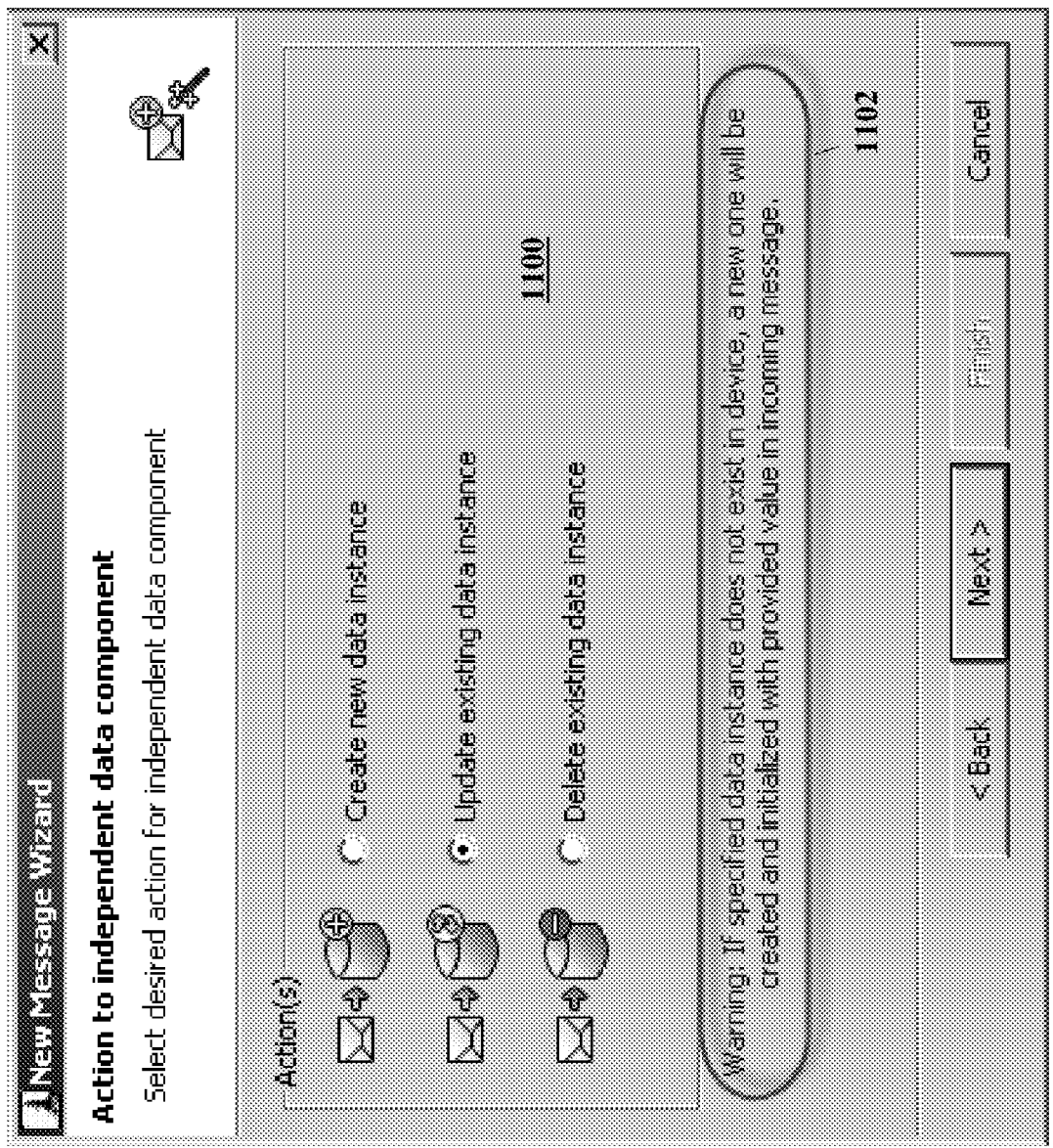
Figure 12:
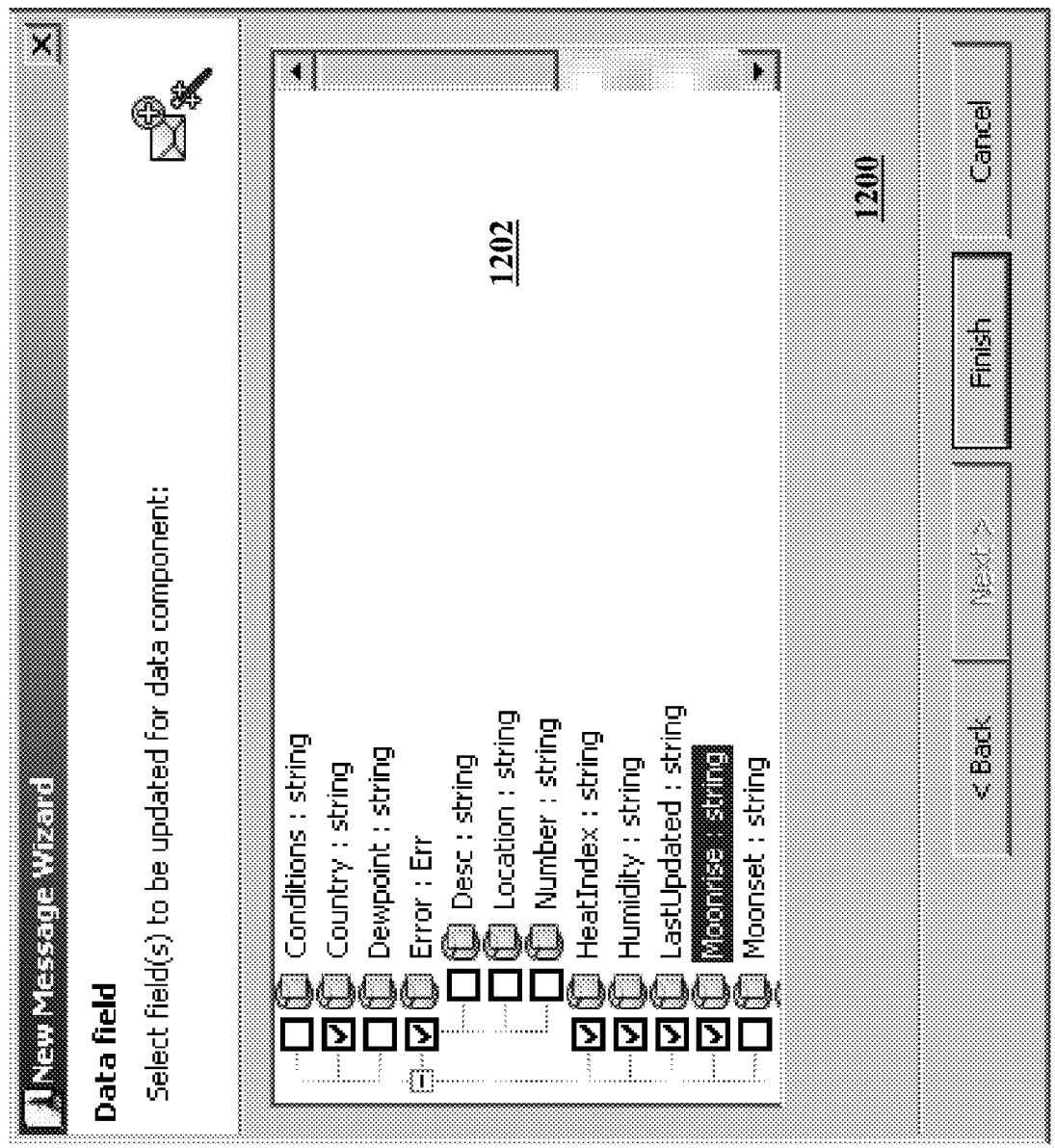

FIG. 11 illustrates an action page 1100 for an independent data component similar to page 700 but where the update action is selected. A notice 1102 to the developer about runtime operation activity may be displayed. A desired data component may be selected (see FIG. 8) and a primary key specified as necessary (see FIG. 9). Data component selection may further permit data field selection to specify one or more specific fields of the selected data component to be updated by the action. FIG. 12 illustrates a data field selection page 1200 for selecting one or more fields 1202.

Figure 13:
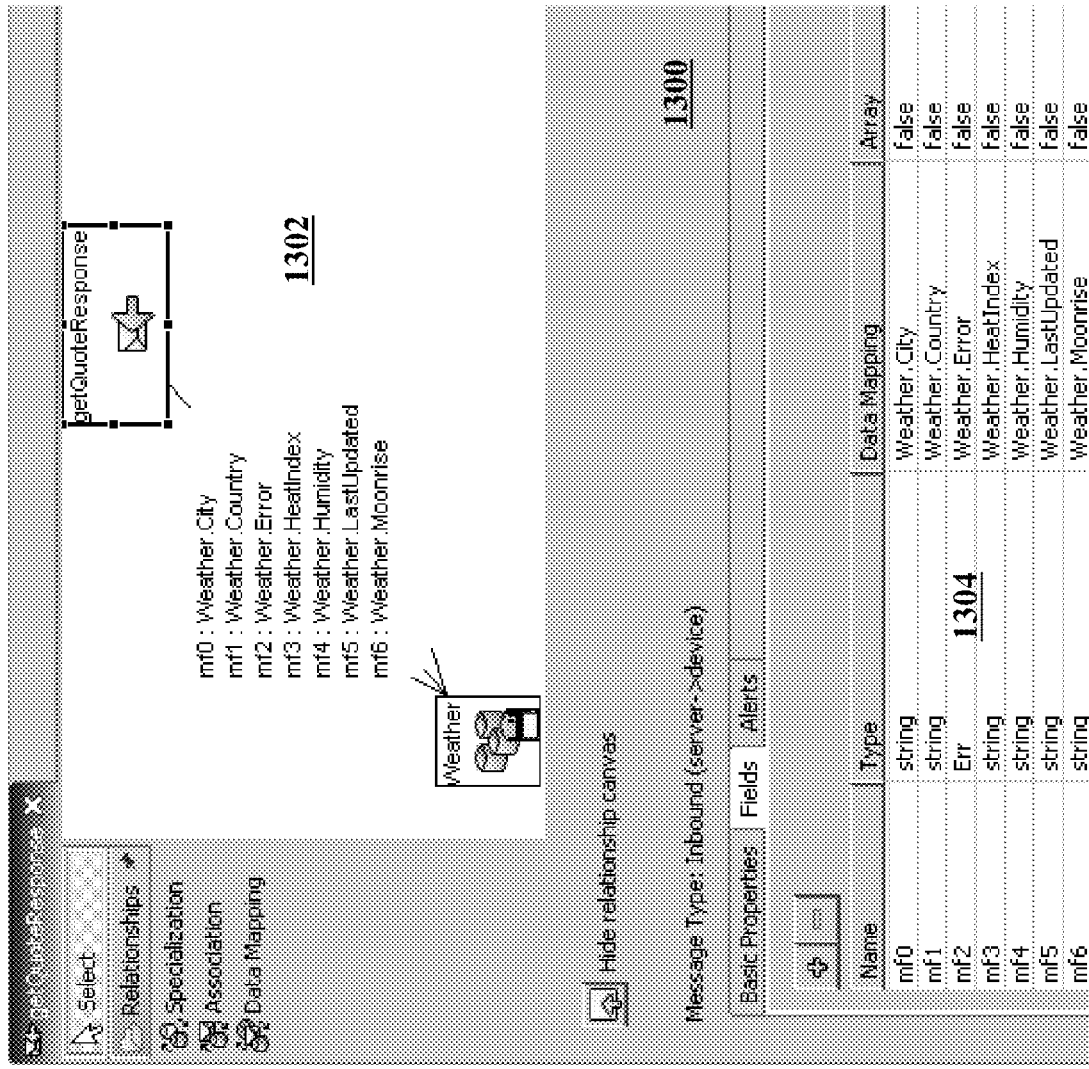

FIG. 13 depicts a generated message page 1300 showing a mapping relationship graphically 1302 and in a listing form 1304 for the message and data component including the specified fields to be updated.

Figure 14A:
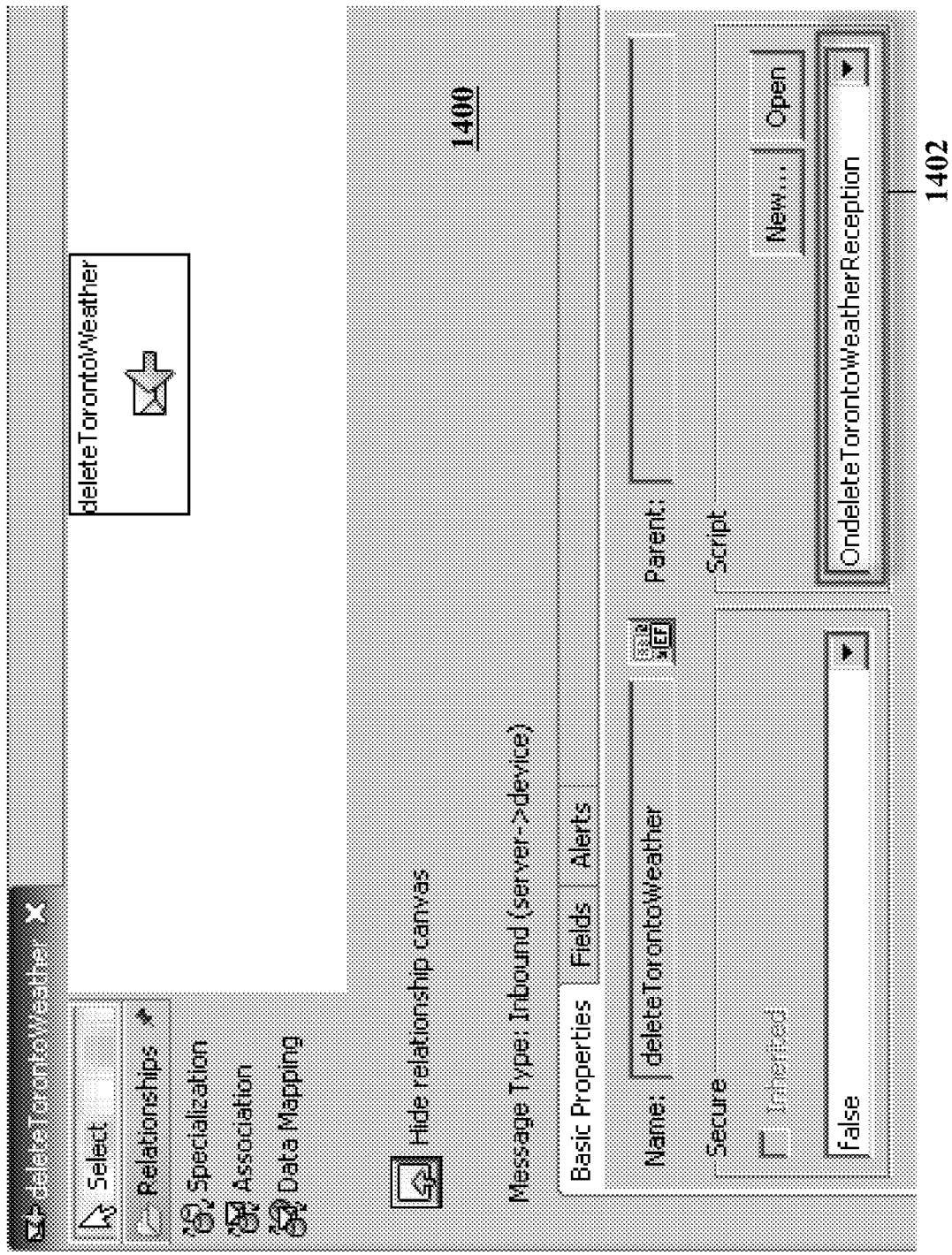
Figure 14B:
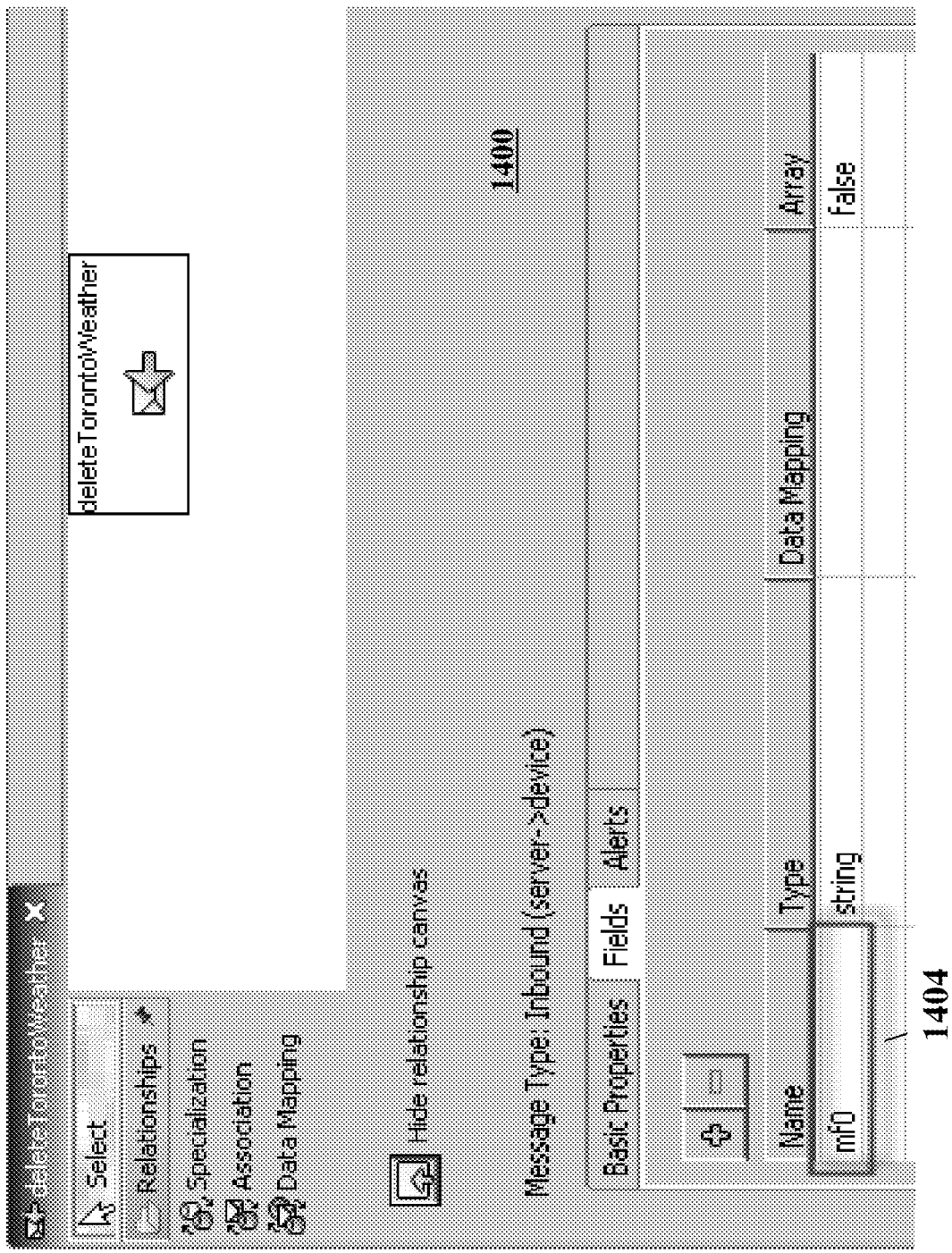

An incoming message may wish to delete a data component. Thus a "delete existing data instance" action may be selected at action page 700 for an incoming message and a particular independent data component identified at page 800 and a primary key specified as described earlier (FIG. 9). A message and associated script are automatically generated. FIGS. 14A and 14B illustrate a generated message page 1400 showing such a message and script 1402 and mapping relationships 1404. FIG. 14B illustrates the auto-generated message field where "mf0" (i.e. messages field 0) holds the primary key of the data component Weather. LIST 1 below shows an example script to delete the component:

```
// Retrieve the data instance.
_weather = Weather.find(deleteTorontoWeather.mf0);
if (_weather == null) return;
// Delete the data instance.
_weather.remove( );
```

LIST 1—Delete Existing Data Instance

Figure 15:
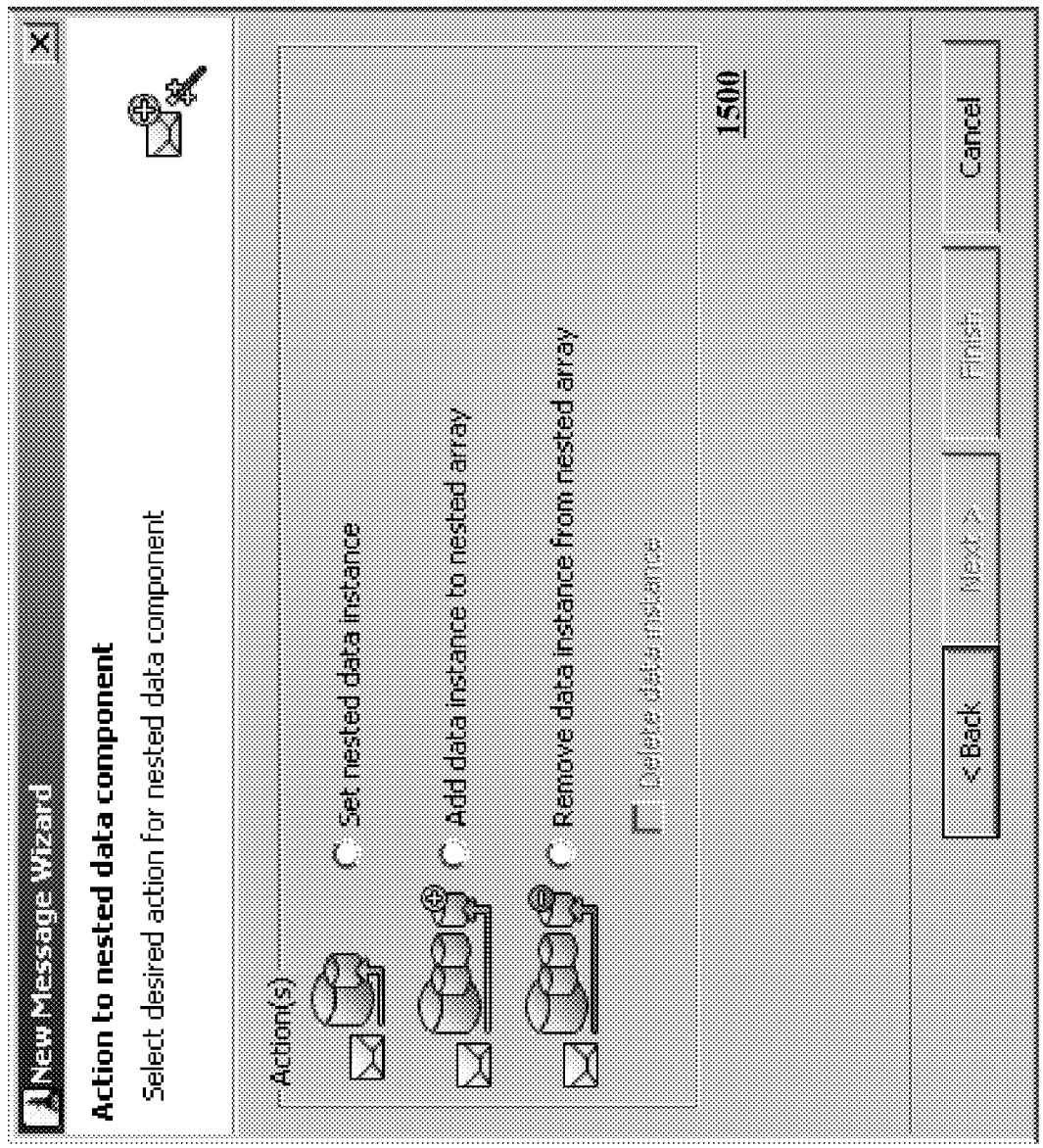
FIGS. 15-26 illustrate representative action, data component selection and message pages for programming a message-related aspect of an application for a second type of data component, namely a nested data component.

For incoming messages that operate on a nested data component, the message wizard facilitates selection or identification of two data components, namely the enveloping and nested components. FIG. 6 illustrates the selection of this data component type operation. FIG. 15 illustrates an action selection page 1500, similar to page 700 but tailored for this data component type. The actions available are "set nested data instance", "add data instance to nested array" and "remove data instance from nested array". In accordance with an embodiment, nested data components are nested in enveloping data using an array structure. When selecting to remove a data instance from the nested array, a developer can select the delete data instance box to delete the data instance as desired.

Figure 16:
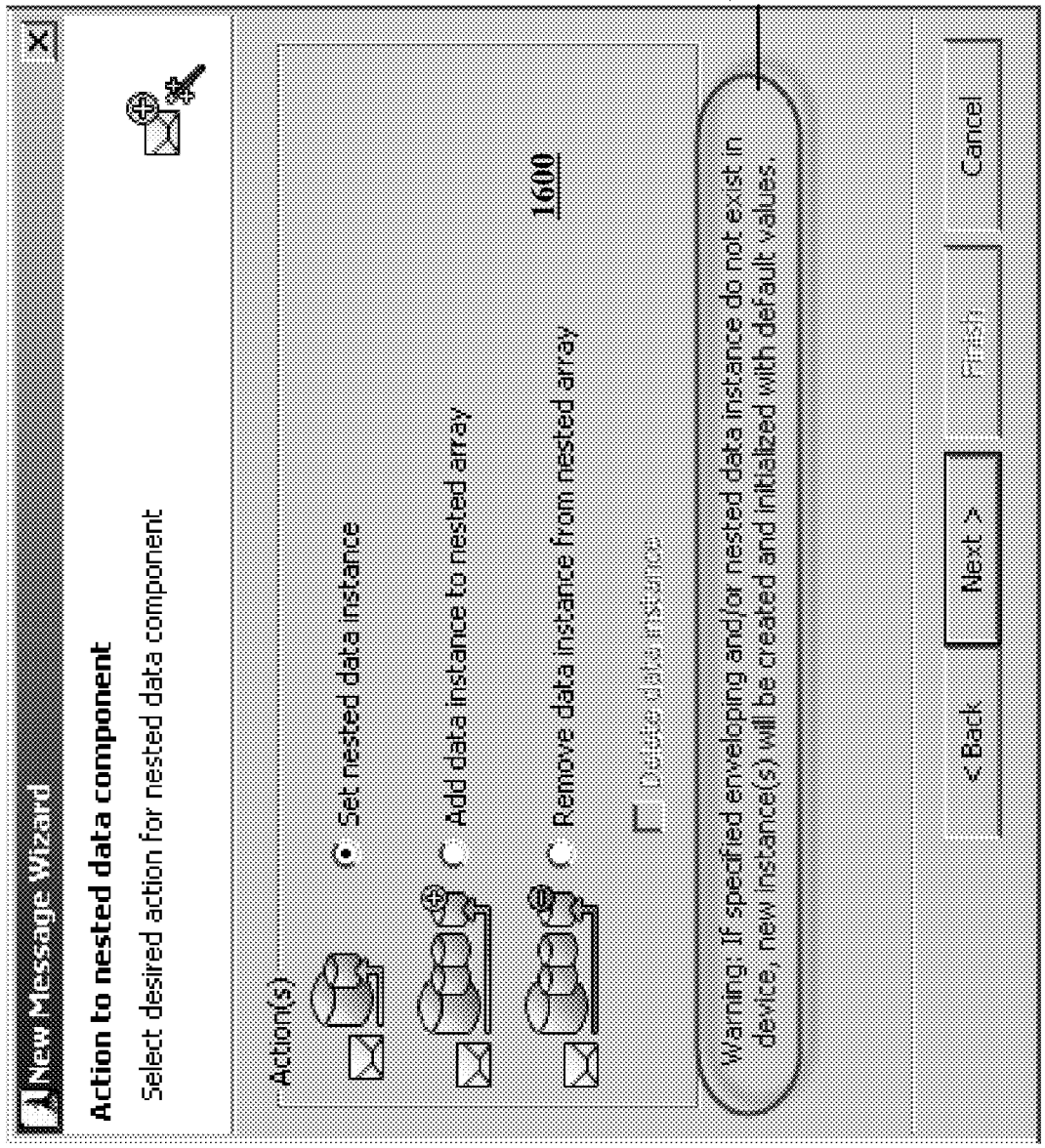
Figure 17:
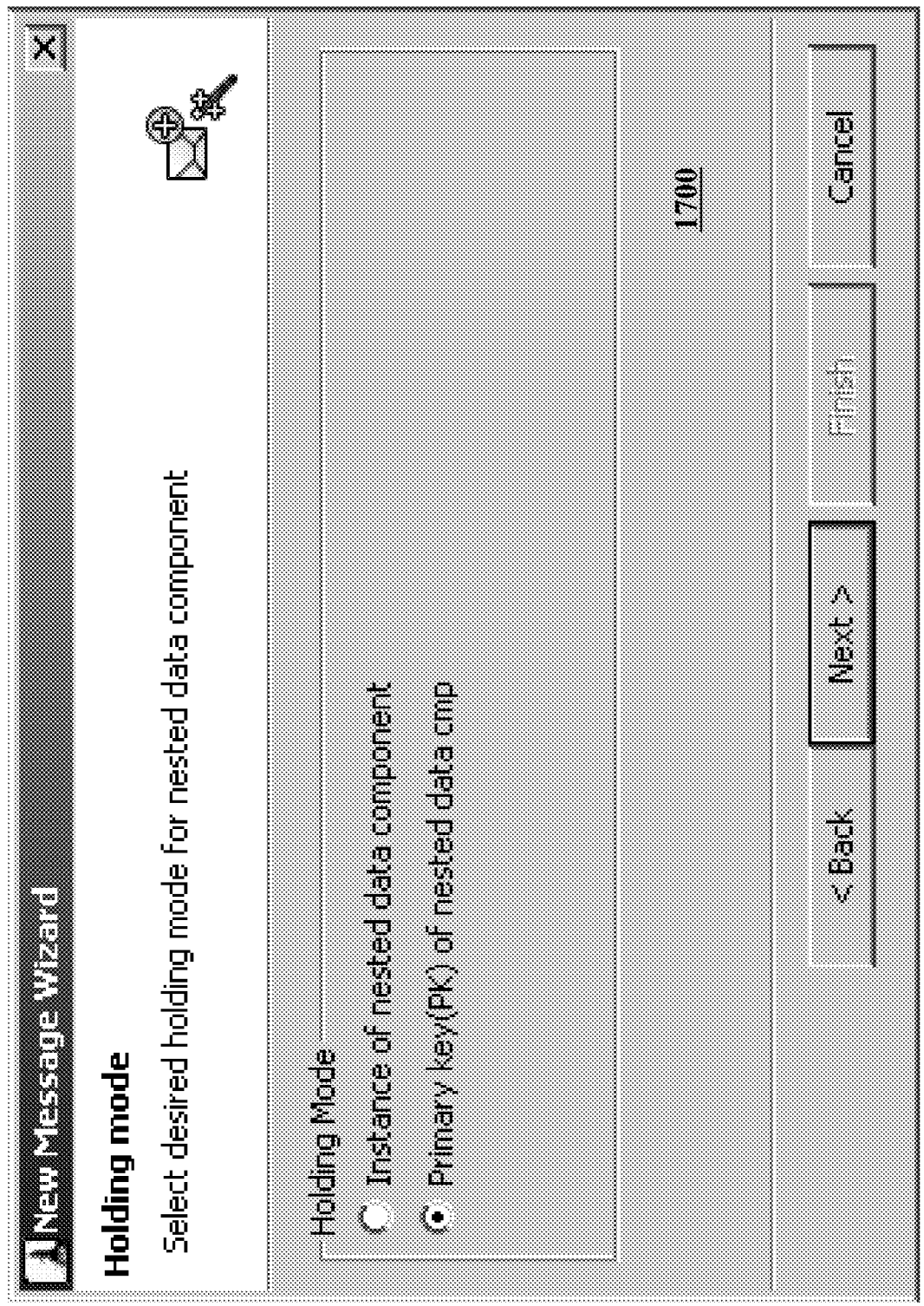
Figure 18:
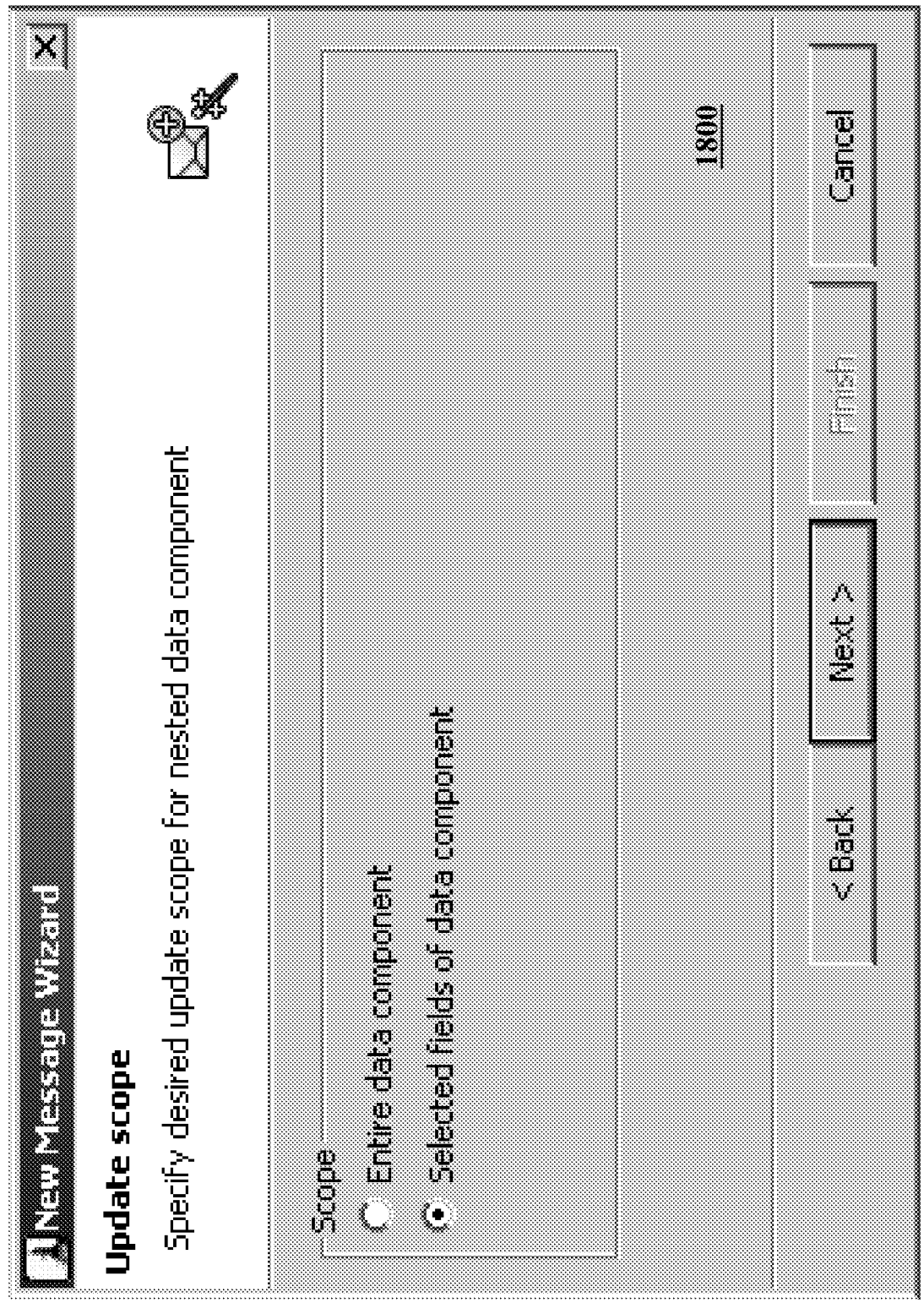

An action page 1600 to facilitate the set nested data instance action is shown in FIG. 16. This action operates to update the corresponding nested data component or its data fields in the enveloping data component where the incoming message specifies both the nested data component and the enveloping data component. A notice may be displayed to describe runtime activity 1602. Further action particulars (namely holding mode and update scope) may be indicated such as via pages 1700 and 1800 (FIGS. 17 and 18).

Figure 19:
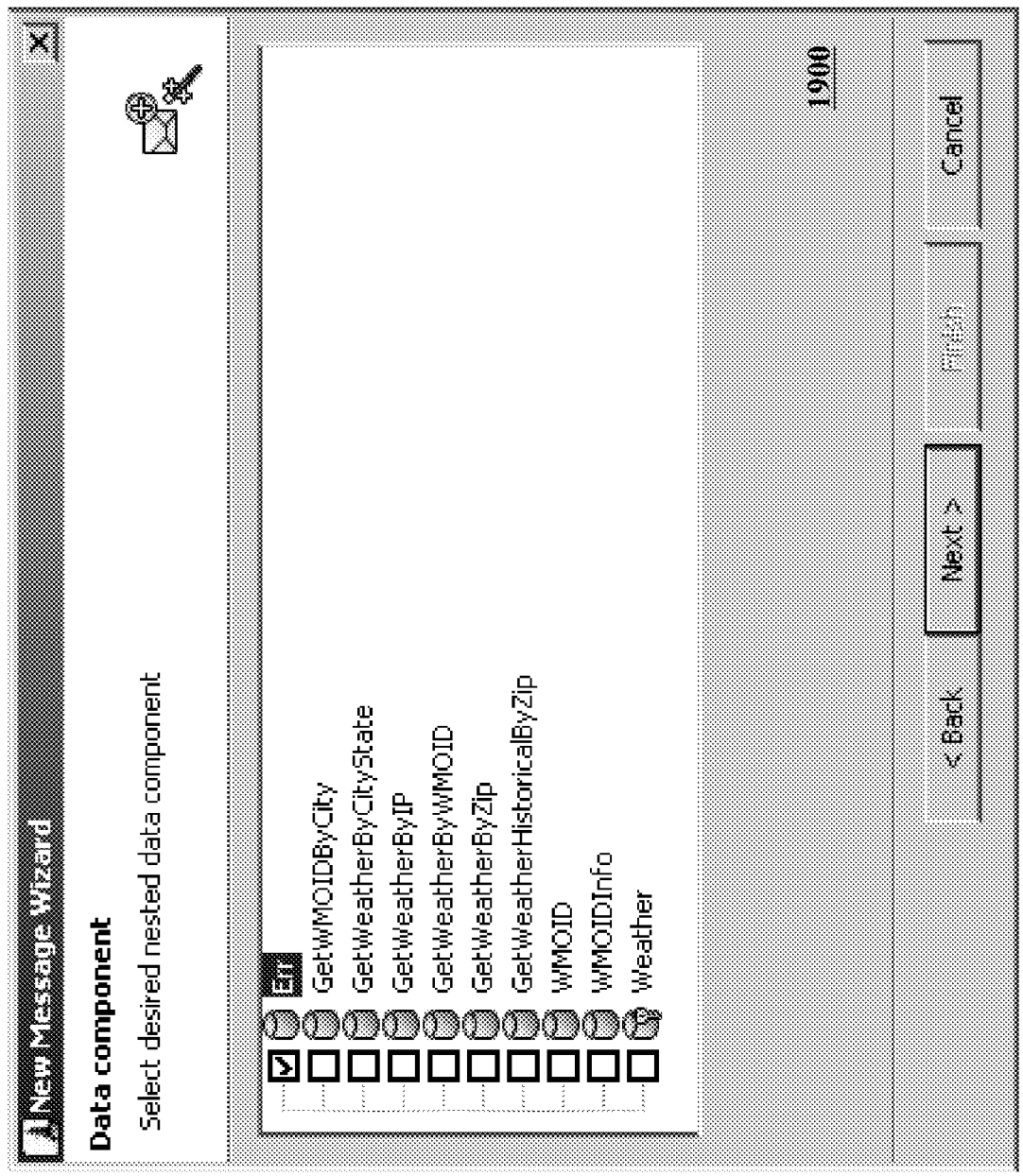
Figure 20:
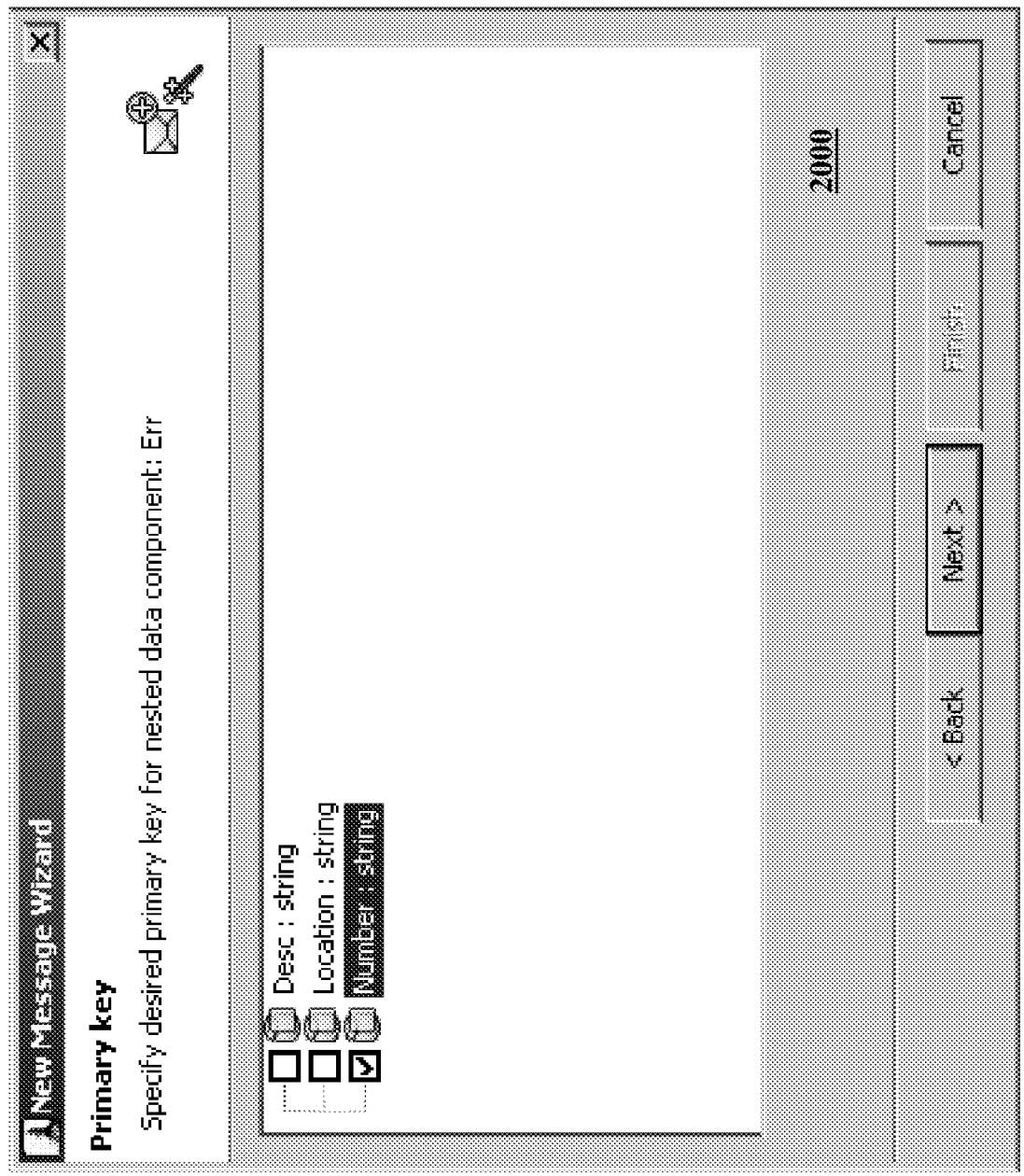
Figure 21:
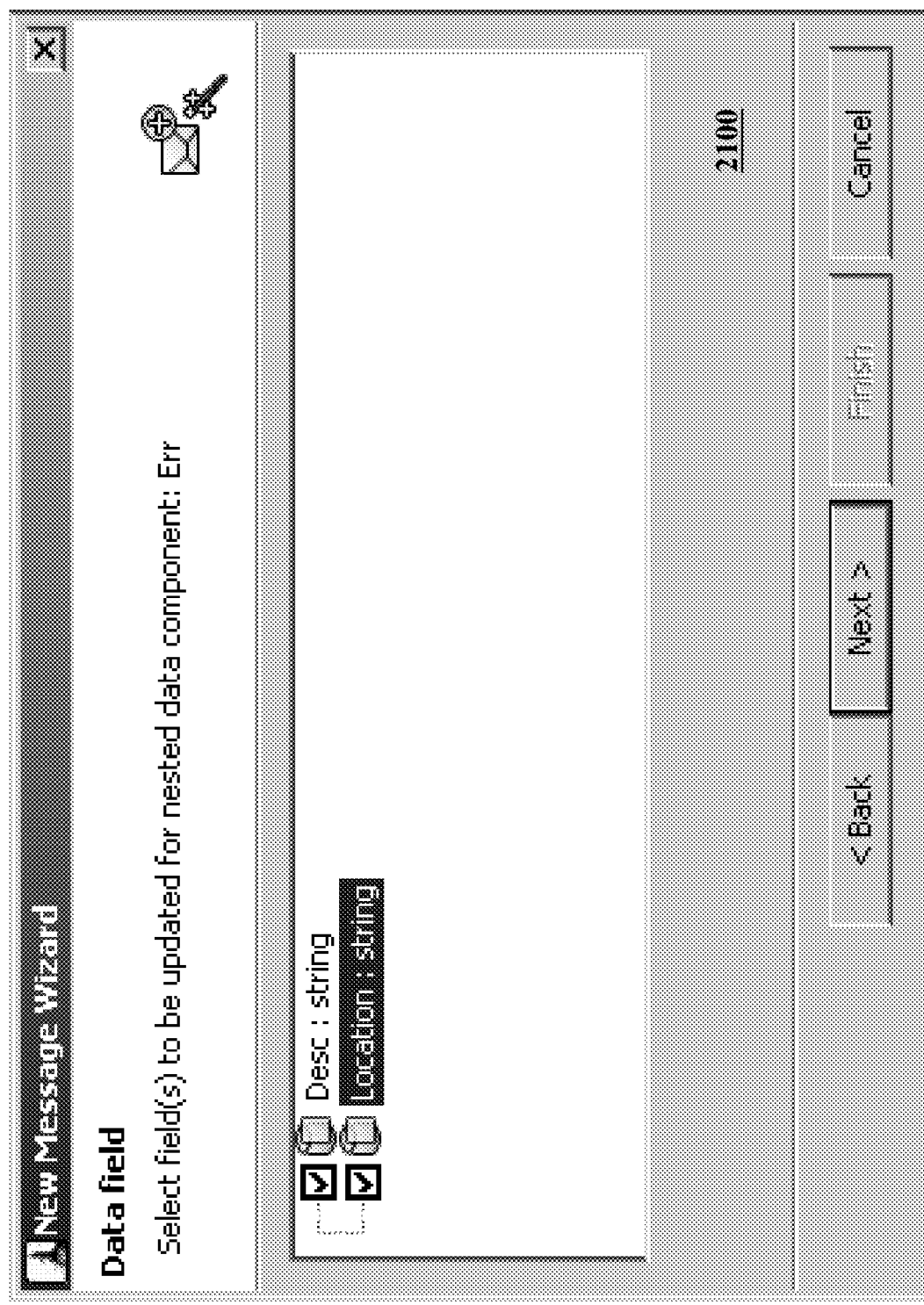
Figure 22:
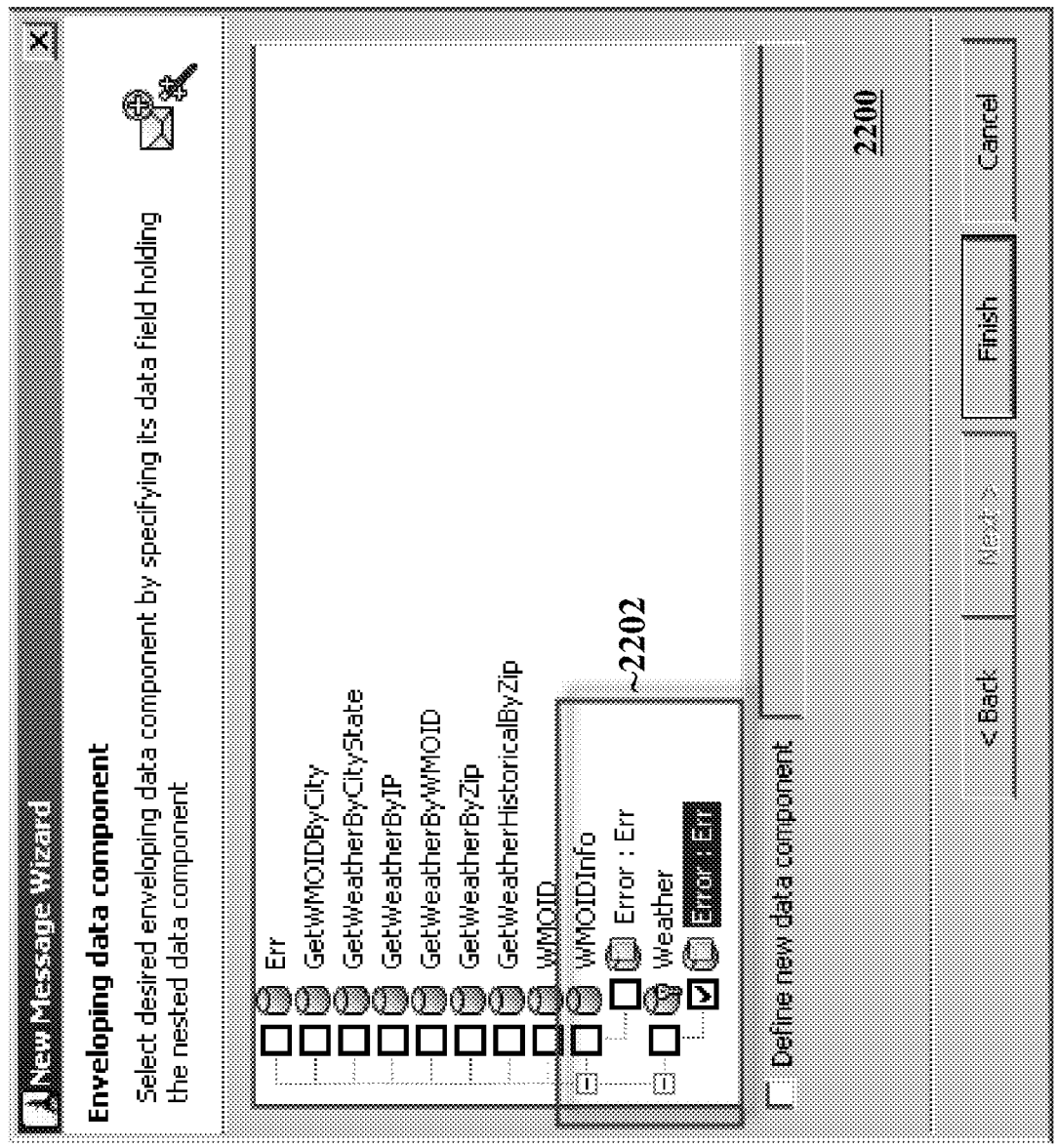
Figure 23:
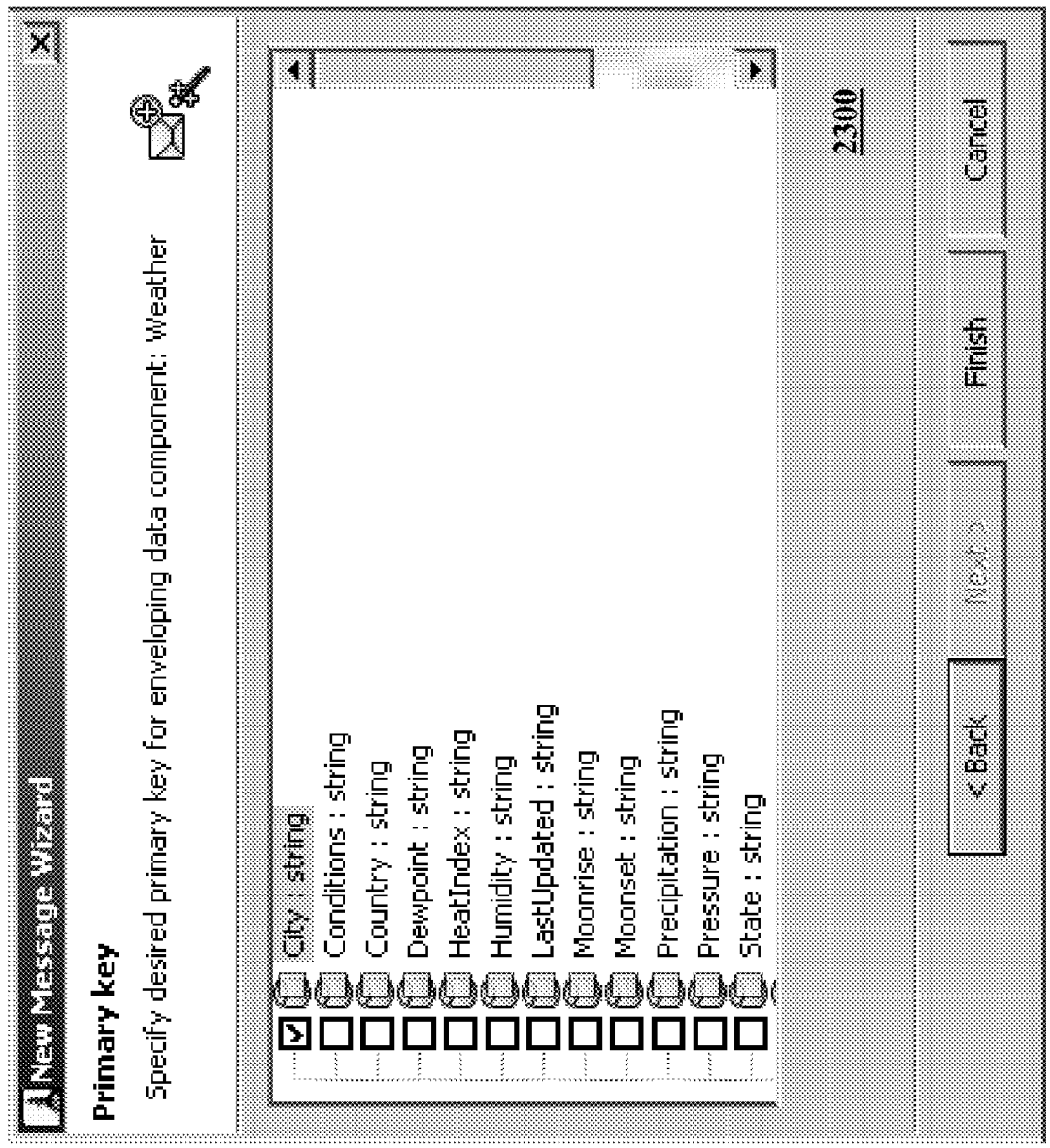

FIGS. 19-20 show data selection page 1900 and primary key specification page 2000, similar to pages 800 and 900, for specifying the nested data component. If update scope (page 1900) indicates "selected fields" are to be updated, field selection in response to the specified nested data component may be made. FIG. 21 shows field selection in a data selection page 2100 for the nested data component. The nested data component is associated to an enveloping data component. Data selection page 2200 shows this selection. Based on the selected nested data component, message wizard 500 has intelligence to find all suitable enveloping data components 2202 for developers. If there is no candidate, or desired one, developers can check "define new data component" checkbox to define a new enveloping data component. If selected enveloping data component does not have primary key, developers can specify one, shown in page 2300 (FIG. 23).

Figure 24A:
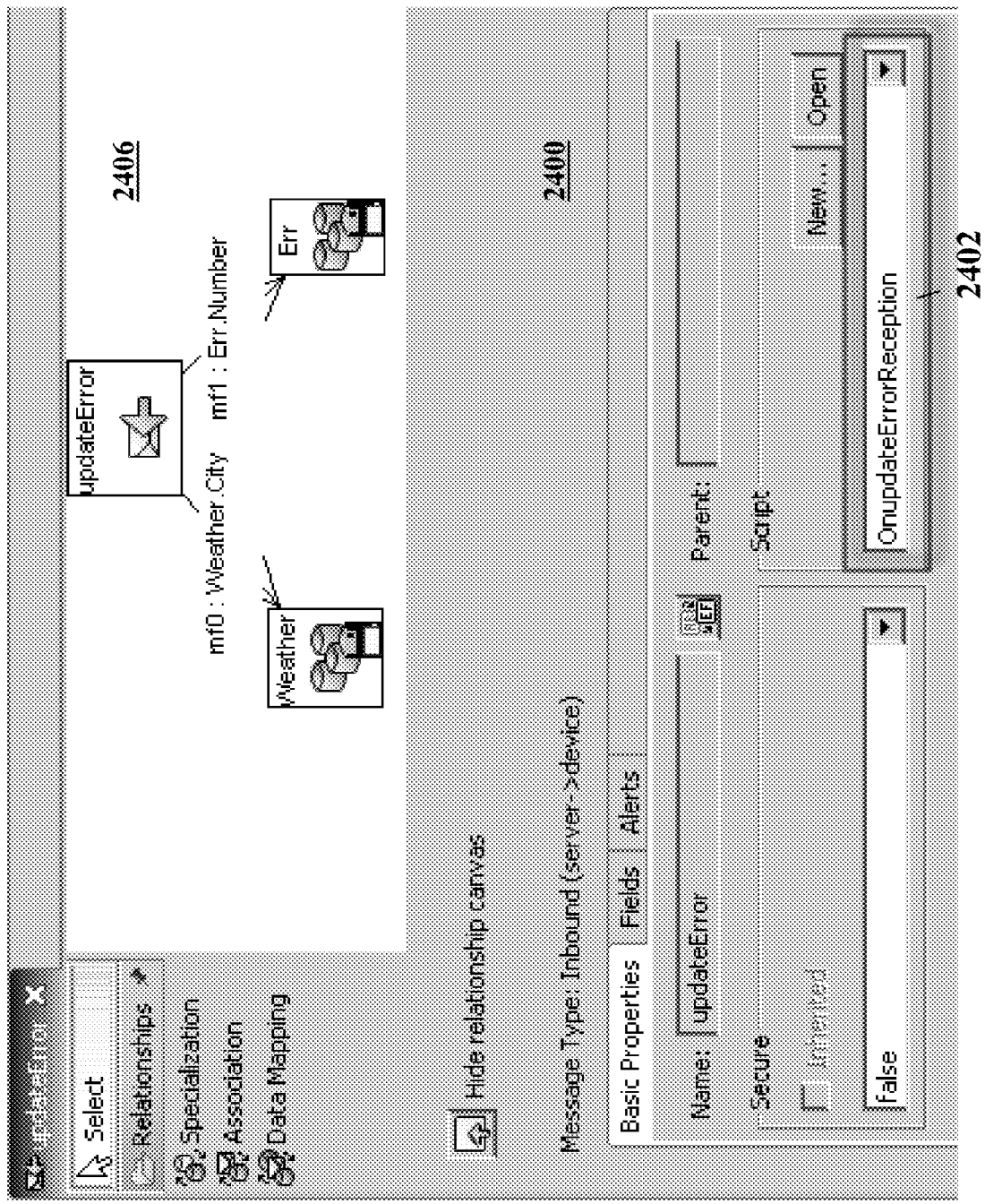
Figure 24B:
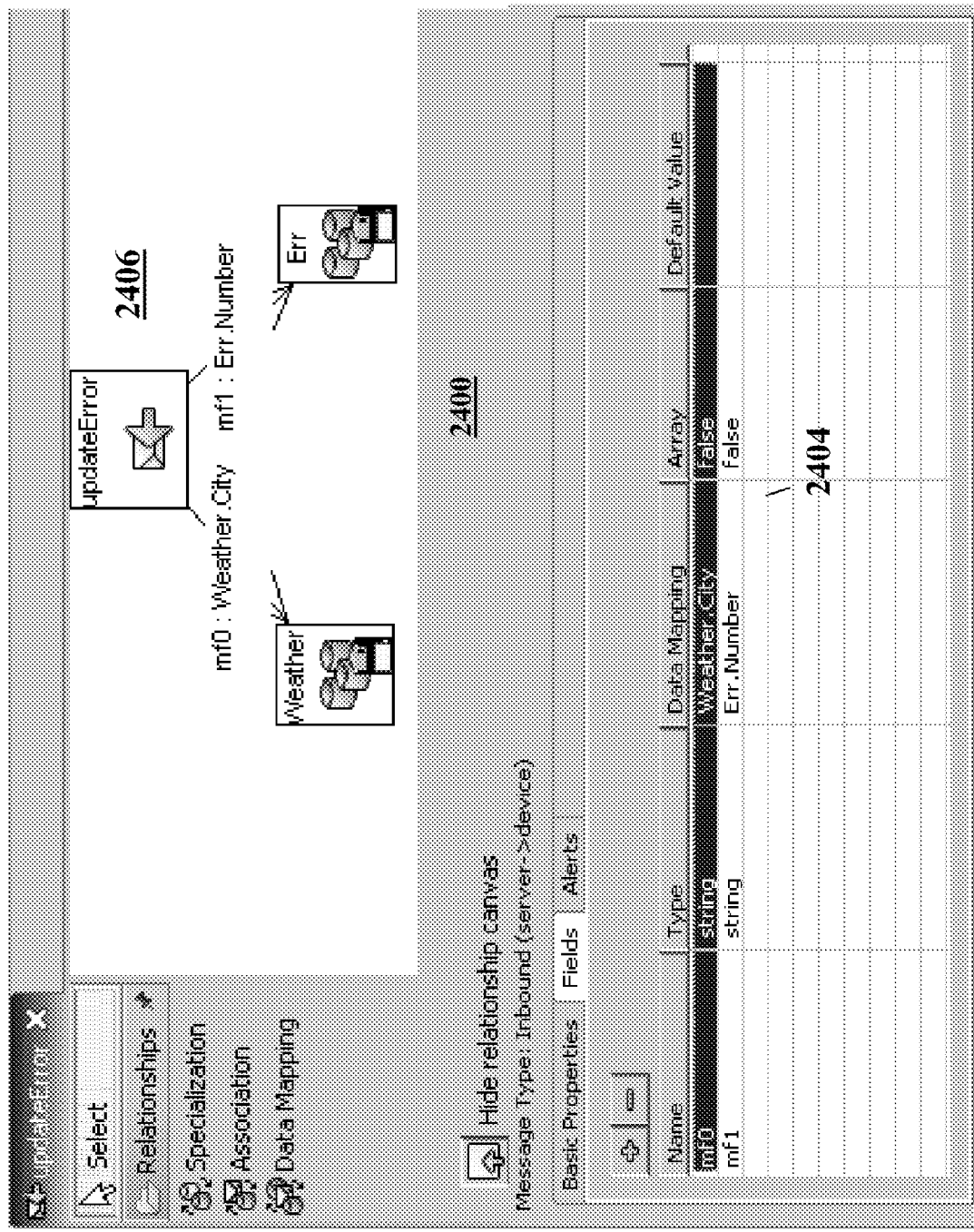

As shown in FIGS. 24A and 24B illustrating message page 2400, two mapping relationships are established among the incoming message, nested data component and enveloping data component. A script 2402 is also automatically created and attached to this message. FIG. 24B shows the auto-generated message fields 2404, where "mf0" is the primary key of the enveloping data component Weather, and "mf1" is the primary key of the nested data component Err as also shown graphically 2406. LIST 2 below shows an example script to set the nested data instance:

```
// Retrieve instance of Weather.
_weather = Weather.find(updateError.mf0);
if (_weather == null) return;
// Retrieve instance of Err.
_err = Err.find(updateError.mf1);
if (_err == null) return;
// Assign selected fields in _err to those in _weather.Error.
if (_weather.Error == null)
    _weather.Error = _err;
else {
    _weather.Error.Desc = _err.Desc;
    _weather.Error.Location = _err.Location;
}
```

LIST 2—Set Nested Data Instance

Figure 25:
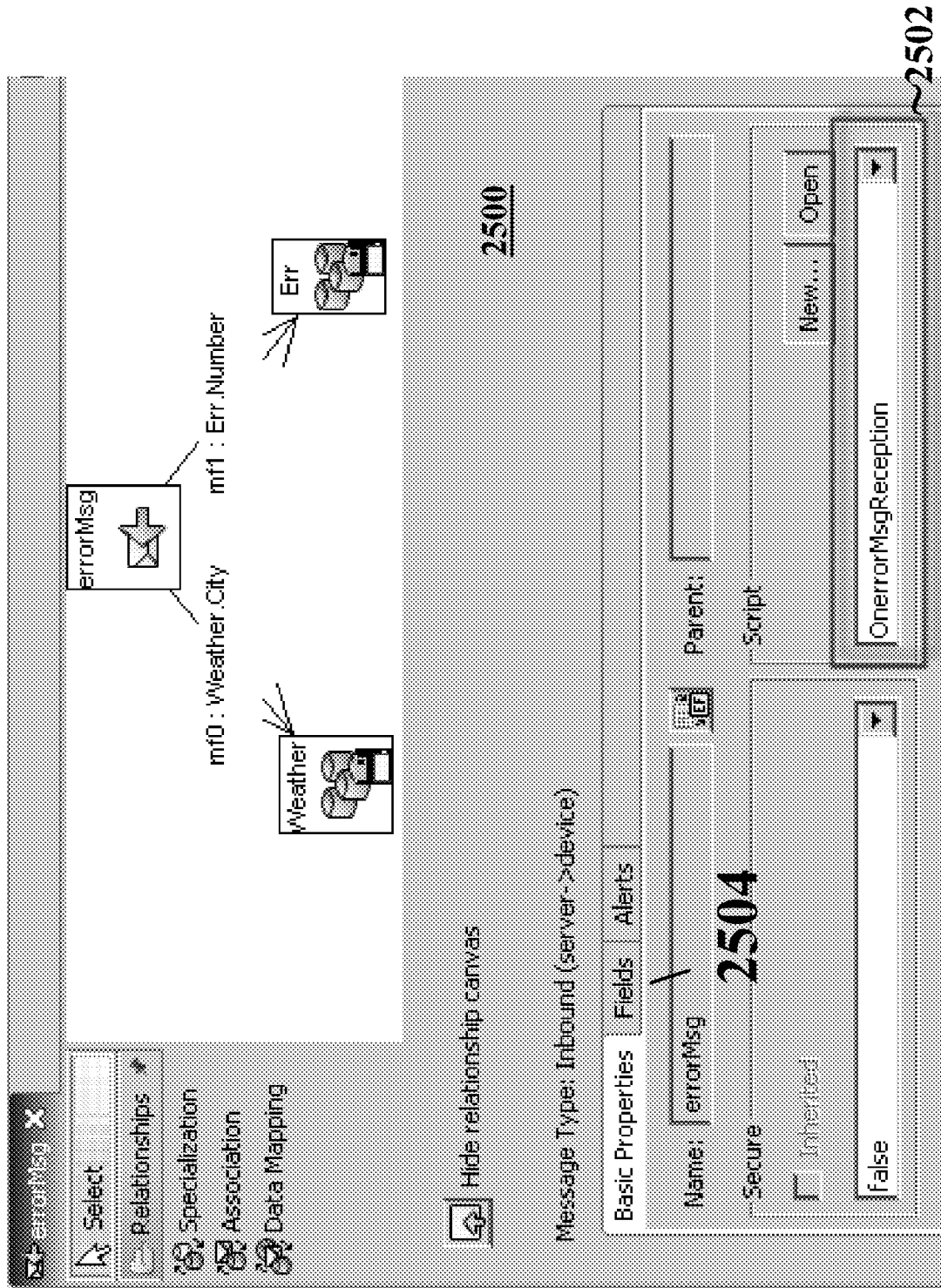

Similar pages and message wizard operations may be performed for the "add nested data instance" action. For such an incoming message, pages 16 to 23 may be presented and suitable data components identified. FIG. 25 shows a message page 2500 similar to page 24A illustrating the mapping relationship and associated script 2502 for this add action example. It is understood that tab 2504 may be invoked to re-display page 2500 similar to that shown in FIG. 24B illustrating message fields mf0 and mf1 with the associated data components. LIST 3 below shows a sample script for an add nested data instance:

```
// Retrieve instance of Weather.
_weather = Weather.find(errorMsg.mf0);
if (_weather == null) return;
// Retrieve instance of Err.
_err = Err.find(errorMsg.mf1);
if (_err == null) return;
// Add _err to the array _weather.Error.
if (_weather.Error == null)
    _weather.Error = new Array( );
_weather.Error.push(_err);
```

LIST 3—Add Nested Data Instance

Figure 26:
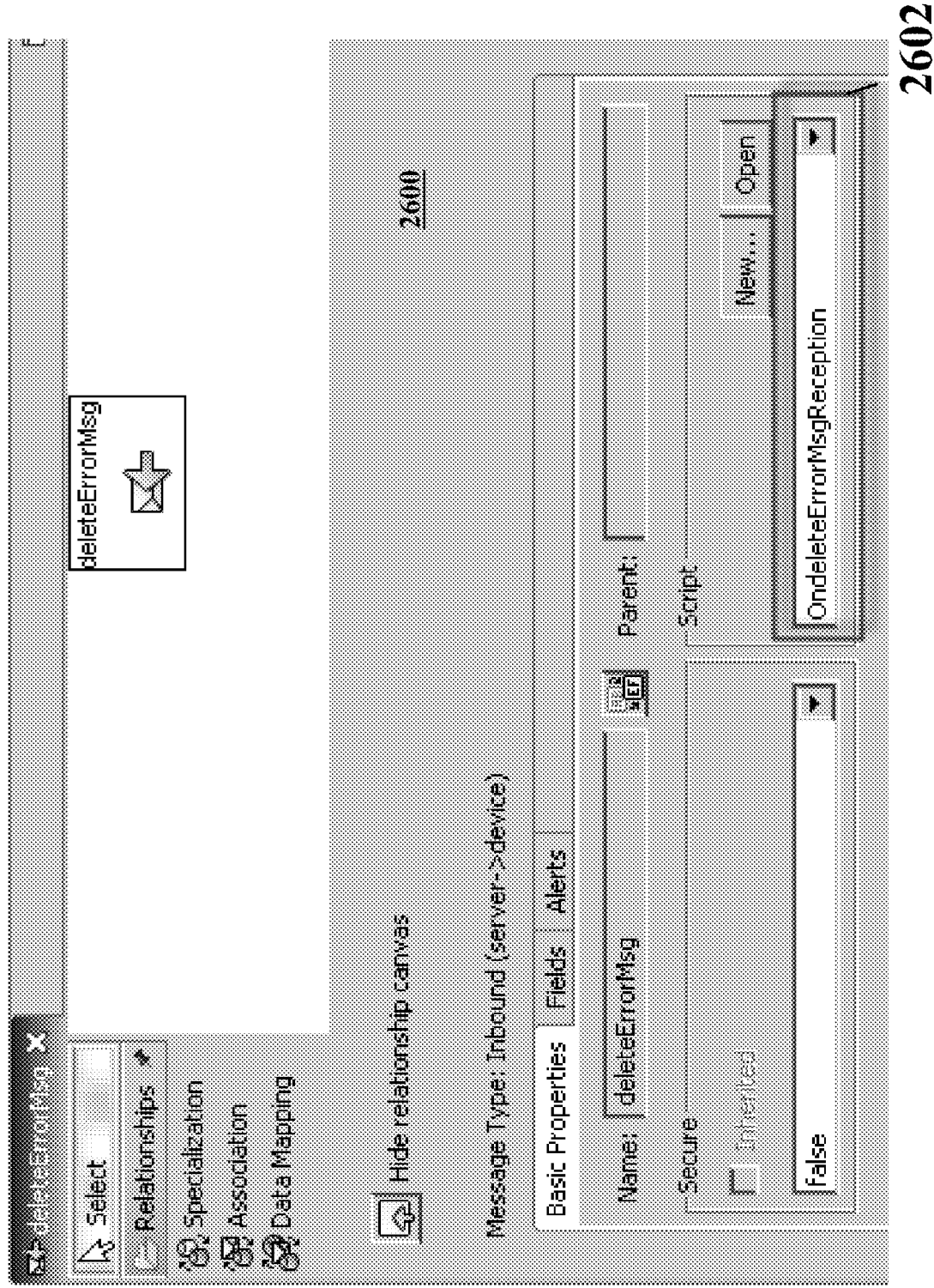

The action to remove a data instance may be indicated at page 1600 (FIG. 16). Similar activities to indicate specific nested data components and enveloping data components for such a message may be followed using pages 1700-2300 as applicable. FIG. 26 shows a message page 2600 for this message operation including the association of a script 2602. LIST 4 below provides an example script to remove a nested data instance:

```
// Retrieve instance of Weather.
_weather = Weather.find(deleteErrorMsg.mf0);
if (_weather == null) return;
// Retrieve instance of Err.
_err = Err.find(deleteErrorMsg.mf1);
if (_err == null) return;
// Remove _err from the array _weather.Error.
_weather.Error.remove(_err);
// Delete the data instance.
_err.remove( );
```

LIST 4—Remove Nested Data Instance

Figure 27:
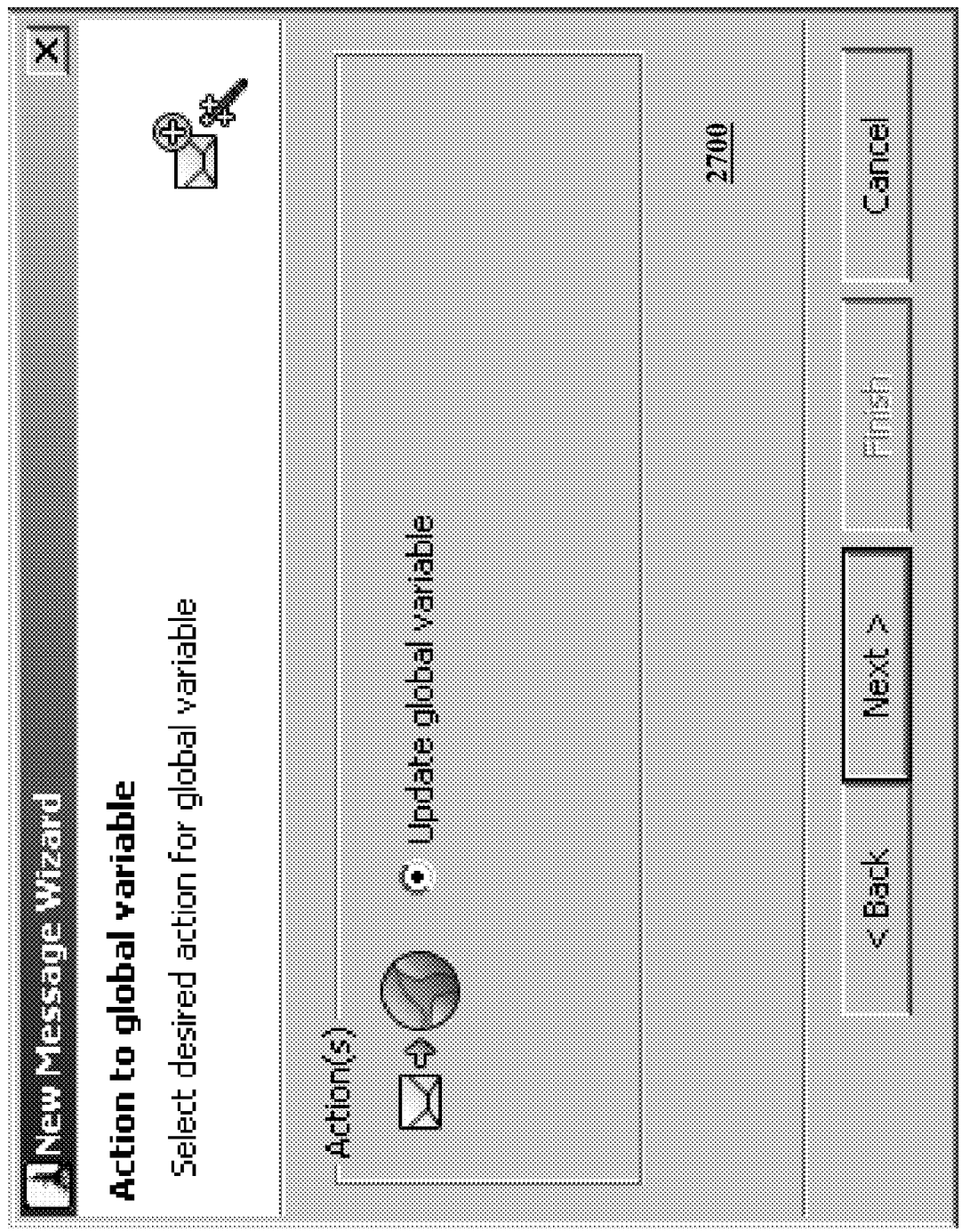
FIGS. 27-29 illustrate representative action, data component selection and message pages for programming a message-related aspect of an application for a third type of data component, namely a global variable data component.
Figure 28:
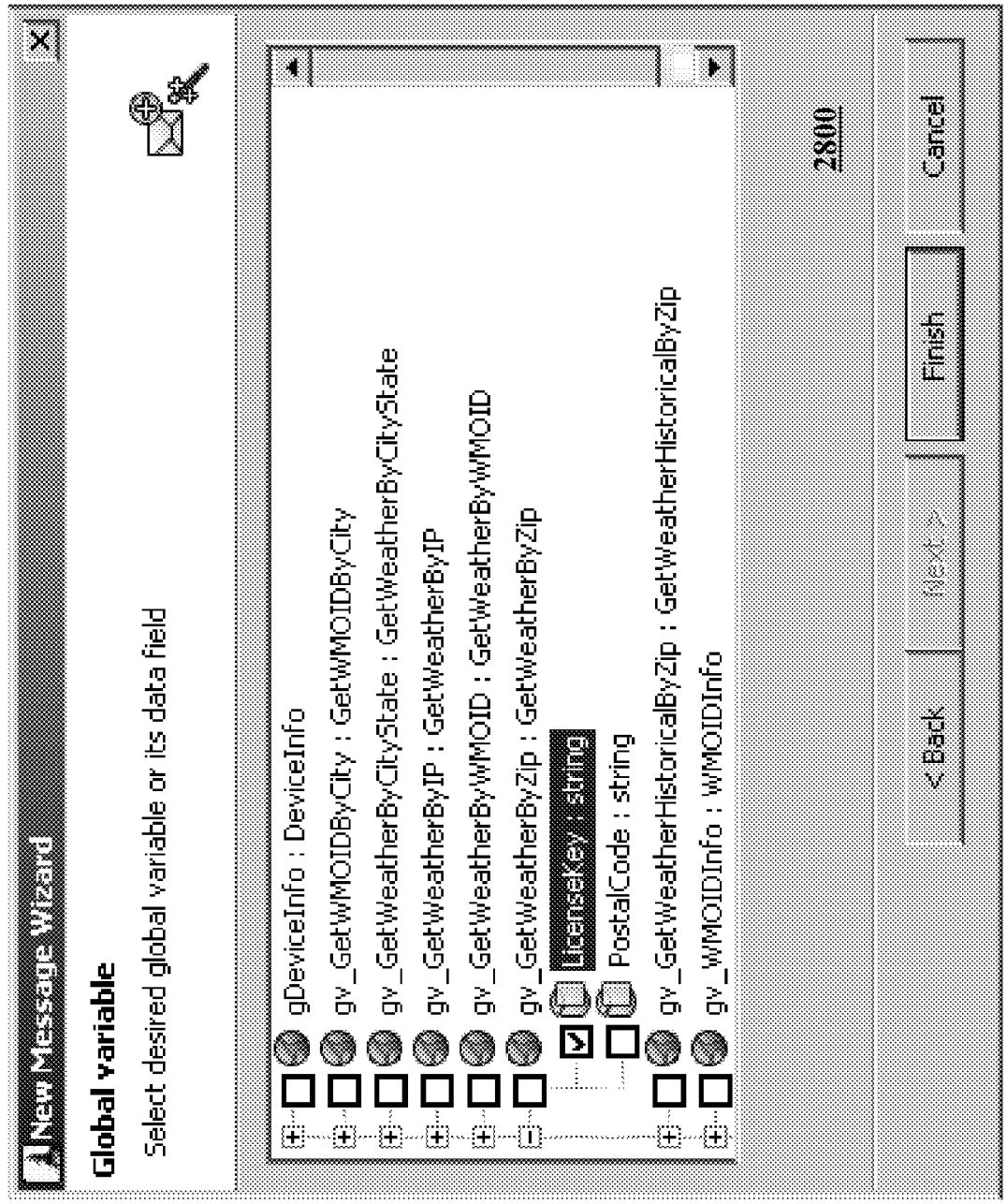
Figure 29:
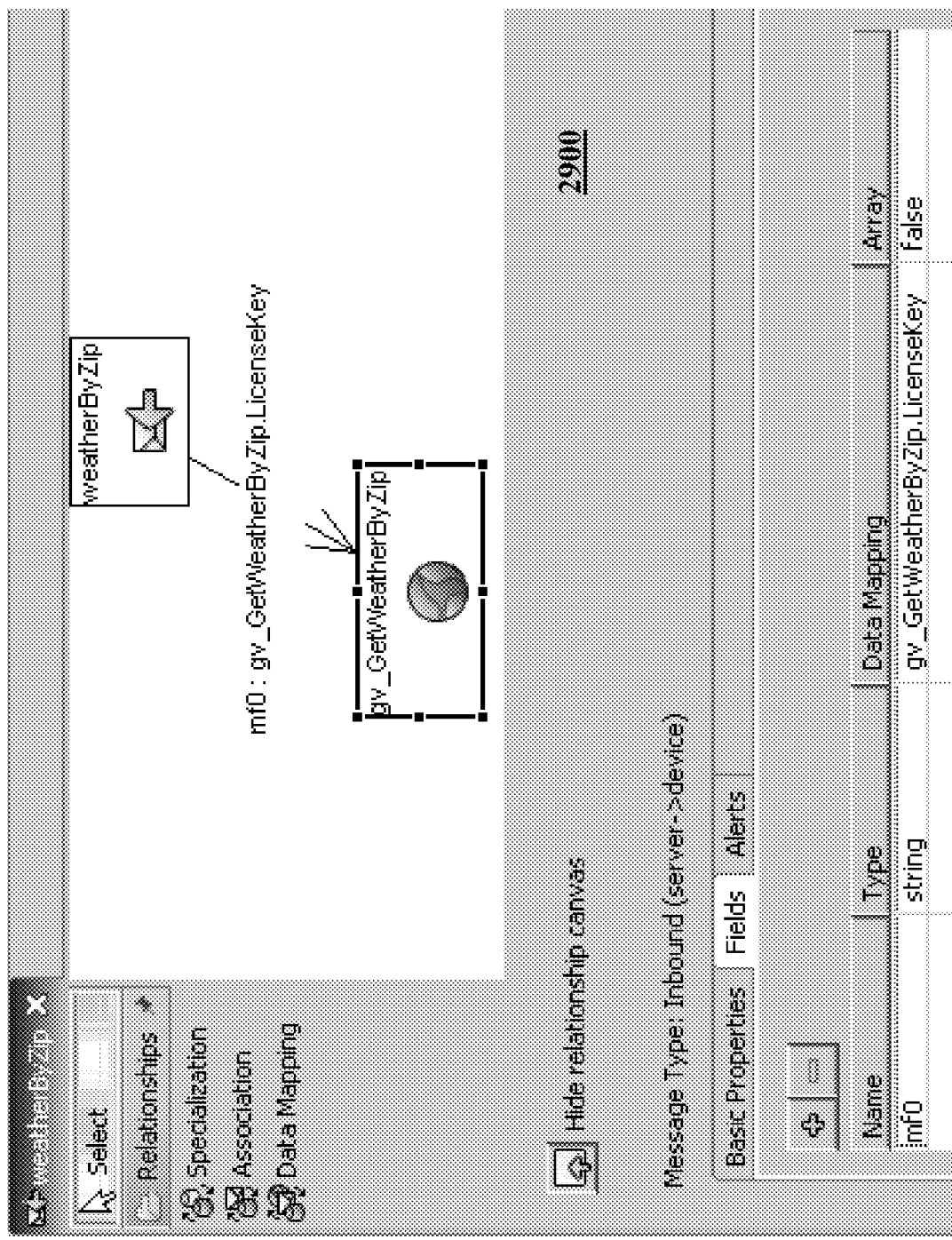

For operations on a global variable data component, the appropriate selection may be made at action target type page 600. FIG. 27 illustrates an action page 2700 for identifying the action "updating a global variable". In the present embodiment, only a single action type is available. FIG. 28 illustrates a data selection page 2800 wherein candidate global variable data components (and data fields thereof are presented for selecting to indicate whether the variable or a field is to be updated by the content of the incoming message. Message page 2800 illustrates the message and mapping relationship for this action type.

What follows are a couple of examples of automatically generated code for messages programmed using the message wizard. It should be clearly understood that these code listings are merely examples of specific messages and are therefore not meant to be limiting in any way. In other words, and for greater certainty, the message wizard can be used to design messages and automatically generate code for any messages or message operation/action for any wireless application or for any other, non-wireless software application. List 5 below shows an XML-based definition for a message shown in FIGS. 14A-B while List 6 shows a definition for a message shown in FIGS. 24A-B.

```
<message name="deleteTorontoWeather"
    script="OndeleteTorontoWeatherReception">
        <field name="mf0"/>
        <alert/>
</message>
```

LIST 5—XML Definition for a Message Shown in FIGS. 14A-B

```
<message name="updateError" script="OnupdateErrorReception">
    <mappedField name="mf0" mapping="Weather.City"/>
    <mappedField name="mf1" mapping="Err.Number"/>
    <alert/>
</message>
```

LIST 6 XML Definition for a Message Shown in FIGS. 24A-B

Once the code is auto-generated, as was mentioned earlier, the message wizard can optionally provide the application developer with the opportunity to manually edit, test and debug the auto-generated code.

While a "wizard" is the preferred mode of implementing the present solution, it will be expressly understood that the methods and systems herein need not be implemented in the form a "wizard" per se. For example, the methods of enabling assisted visual application development could be implemented in a logically apparent series of pull-down menus or a sequence of buttons/icons that are launched in a clear sequence. Furthermore, it should be appreciated that while a specific order of the message wizard operations and page presentation was illustrated in the embodiments, with an action being specified before a data component (i.e. target of the action) was specified, at least in some situations, the target data component may be specified first and the action upon it specified second. Therefore, the order of these selections should not be construed as being essential.

Thus, in general a message wizard enables assisted visual development of operations to process an incoming message for an application on a communication device. The wizard provides a series of pages from which a developer can select a desired action to perform on a target upon receipt of the incoming message and select a specific target comprising at least one data component from a set of candidate data components. The wizard then automatically generates code to implement the selected action on the target. A message page to visualize the message, target and the relationship between them and, as applicable, any script generated to implement the action may also be provided. The wizard may provide a data component type page to select a type of data component and then provide the series of pages in response to the type of data component selected.

The embodiments described above are intended to be exemplary only. The scope of the invention is therefore intended to be limited solely by the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A method of enabling assisted visual development of incoming message handling operations for an application on a communication device, the method comprising steps of:
   providing a data component type page from which a type of data component is selectable;
   in response to a selection of the type of data component, providing an action page from which a desired action is selectable from one or more candidate actions to perform on a target upon receipt of an incoming message;
   providing at least one data selection page from which a specific target comprising at least one data component from a set of candidate data components is selectable; and
   automatically generating code to implement the selected action on the target,
   wherein the step of providing an action page is performed before the step of providing at least one data selection page.

2. The method as claimed in claim 1 wherein the step of providing at least one data selection page is responsive to the selection of the type of data component.

3. The method as claimed in claim 2 wherein the step of providing a data component type page presents a plurality of data component types from which the type of data component is selectable, said plurality of types comprising: an independent data component type, a nested data component type and a global variable data component type.

4. The method as claimed in claim 2 wherein the step of providing the at least one data selection page comprises the steps of determining candidate data components in accordance with the selection of the type of data component and displaying only the candidate data components that are compatible with the selection of the type of data component.

5. The method as claimed in claim 1 wherein the step of providing the at least one data selection page comprises the step of providing an option to define a new data component.

6. The method as claimed in claim 1 wherein the step of providing the at least one data selection page comprises the steps of determining a respective primary key for each of the data components of the target in accordance with the type of data component and providing an interface to define the respective primary key.

7. The method as claimed in claim 1 wherein the step of providing the at least one data selection page comprises providing an interface to select one or more data fields of the target.

8. The method as claimed in claim 1 comprising the step of providing a message page to visualize the message and its relationship to the target.

9. The method as claimed in claim 8 wherein the step of providing a message page comprises providing an interface to graphically illustrate the message, the target, a mapping relationship between the message and the target.

10. The method as claimed in claim 9 wherein the step of providing a message page comprises providing an interface to the auto-generated code, said code comprising a script generated to implement the action.

11. The method as claimed in claim 1 wherein the step of providing an action page comprises the step of displaying a warning message about behaviour of the action during runtime of the application.

12. A system for visually assisting an application developer with development of operations to process an incoming message for an application executing on a communication device in a wireless network, the system comprising:
   a computing device for exchanging data with a data network whereby a wireless application can be uploaded to an application gateway that mediates between the data network and a wireless network serving a plurality of wireless devices to thus enable the wireless devices to download the wireless application;
   an application development environment (ADE) running on the computing device, the ADE including a message wizard for visually assisting the application developer with the development of operations to process an incoming message by the application, the ADE including a plurality of graphically presented options for viewing and selecting action target types comprising types of data components, action options, and specific targets for the selected actions, whereby the ADE visually guides the application developer through the creation of the message and then automatically generates code for executing operations defined by the message.

13. The system as claimed in claim 12 wherein the ADE comprises a message wizard for graphically presenting the options in a sequence of pages including:
   a data component type page from which a type of data component is selectable:
   an action page to enable a selection of a desired action to perform on the target upon receipt of the incoming message; and
   at least one data selection page to enable a selection a specific target comprising at least one data component from a set of candidate data components; and a code auto-generator for automatically generating the code that is capable of executing the action on the target upon receipt of the message, wherein the action page is presented in response to the selection of the type of data component, and wherein the action page is presented before the at least one data selection page.

14. The system as claimed in claim 13 wherein the sequence of pages further includes a data component type page from which a type of data component is selectable and wherein the presentation of the action page and the at least one data selection page is responsive to the type of data component selected.

15. The system as claimed in claim 13 wherein the at least one data selection page comprises an interface to specify a primary key for the data component selected.

16. The system as claimed in claim 13 wherein the at least one data selection page further comprises an option to define a new data component.

17. The system as claimed in claim 13 wherein the sequence of pages further includes a message page to visualize the message and its relationship to the target.

18. The system as claimed in claim 17 wherein the message page provides an interface to graphically illustrate the message, the target and a mapping relationship between the message and the target.

19. The system as claimed in claim 17 wherein the message page provides an interface to the auto-generated code, said code comprising a script generated to implement the action.

20. A computer program product having a storage with computer readable code embodied therein, for execution by a processor of a computing system, said code configuring the processor to implement the method of claim 1.

* * * * *